United States Patent [19]
Lape et al.

[11] Patent Number: 5,165,091
[45] Date of Patent: Nov. 17, 1992

[54] FIRMWARE DOWNLOAD FROM A REMOTE TERMINAL TO AN OPTICAL NETWORK TERMINAL IN A DIGITAL LOOP CARRIER SYSTEM

[75] Inventors: Kelly J. Lape; Steven S. Gorshe, both of Beaverton, Oreg.

[73] Assignee: NEC America Inc., Melville, N.Y.

[21] Appl. No.: 672,707

[22] Filed: Mar. 20, 1991

[51] Int. Cl.⁵ .......................... H04J 3/02; H04M 7/00
[52] U.S. Cl. ..................................... 370/79; 370/94.1; 379/93
[58] Field of Search ....................... 370/94.1, 85.1, 79; 379/93, 94

[56] References Cited
U.S. PATENT DOCUMENTS 4,792,941 12/1988 Yanosy, Jr. et al. ............... 370/85.1
4,864,557 9/1989 Morton et al. ........................ 370/29

*Primary Examiner*—Douglas W. Olms
*Assistant Examiner*—Min Jung
*Attorney, Agent, or Firm*—Sughrue Mion Zinn Macpeak & Seas

[57] ABSTRACT

A multiplexing communications system comprising a first terminal means for transmitting and receiving user digitized data, a second terminal means for transmitting and receiving the user digitized data, and a communications link means for conveying the user digitized data in either direction between the first terminal means and the second terminal means. The first terminal means maintains a copy of digital control data which is necessary for controlling the second terminal means. The first terminal means has first download means for transmitting this digital control data to the second terminal means via the communications link means. The second terminal means contains a memory means for storing the digital control data, and control means for controlling the second terminal means during its normal transmitting and receiving operations. The control means requires that the digital control data be accessible from the memory means. The second terminal means also contains a second download means for receiving the digital control data from the first download means via the communications link means.

19 Claims, 14 Drawing Sheets

CONTROL MESSAGE FORMAT: OLU/ONT MPU TO OLU/ONT FWDH

| COMMAND | MEANING |
|---|---|
| NRMLOP | OLU/ONT ALLOWED TO RESPOND TO FWDL REQUEST FROM OTHER END |
| MPUREQ | OLU/ONT FWDH IS TO BEGIN FIRMWARE DOWNLOAD |
| DSBLFW | OLU/ONT IS TO IGNORE FWDL REQUESTS FROM OTHER END |

FIG. 4

OVERHEAD CHANNEL #28: OLU FWDH TO ONT FWDH

| MOD | BIT1 | BIT2 | BIT3 | BIT4 | BIT5 | BIT6 | BIT7 | BIT8 |
|---|---|---|---|---|---|---|---|---|
| 0 | A1 | A2 | A3 | FWDL | A5 | A6 | A7 | A8 |
| 1 | A9 | A10 | A11 | FWDL | A13 | A14 | A15 | A16 |

FIG. 5

OVERHEAD CHANNEL #28: ONT FWDH TO OLU FWDH

| MOD | BIT1 | BIT2 | BIT3 | BIT4 | BIT5 | BIT6 | BIT7 | BIT8 |
|---|---|---|---|---|---|---|---|---|
| 0 | A1 | A2 | A3 | A4 | A5 | A6 | A7 | A8 |
| 1 | A9 | A10 | A11 | A12 | A13 | A14 | A15 | A16 |
| 2 | A17 | A18 | A19 | FWDL | A21 | A22 | A23 | A24 |
| 3 | A25 | A26 | A27 | FWDL | A29 | A30 | A31 | A32 |

FIG. 6

FRAME FORMAT FOR OLU FWDH TO ONT FWDH COMMUNICATIONS

| | CNTL | ADDR0 | ADDR1 | 21 FIRMWARE BYTES | | | 8 OVERHEAD BYTES |
|---|---|---|---|---|---|---|---|
| FRAME 0 | CNTL | ADDR0 | ADDR1 | 21 FIRMWARE BYTES | | | 8 OVERHEAD BYTES |
| FRAME 1 | CNTL** | UNUSED | | 22 FIRMWARE BYTES | | | 8 OVERHEAD BYTES |
| FRAME 2 | CNTL** | UNUSED | | 22 FIRMWARE BYTES | | | 8 OVERHEAD BYTES |
| FRAME 3 | CNTL** | UNUSED | | 22 FIRMWARE BYTES | | | 8 OVERHEAD BYTES |
| FRAME 4 | CNTL** | UNUSED | | 22 FIRMWARE BYTES | | | 8 OVERHEAD BYTES |
| FRAME 5 | CNTL** | UNUSED | | 22 FIRMWARE BYTES | | | 8 OVERHEAD BYTES |
| FRAME 6 | CNTL** | UNUSED | | 22 FIRMWARE BYTES | | | 8 OVERHEAD BYTES |
| FRAME 7 | CNTL** | UNUSED | | 22 FIRMWARE BYTES | | | 8 OVERHEAD BYTES |
| FRAME 8 | CNTL** | UNUSED | | 22 FIRMWARE BYTES | | | 8 OVERHEAD BYTES |
| FRAME 9 | CNTL** | UNUSED | | 22 FIRMWARE BYTES | | | 8 OVERHEAD BYTES |
| FRAME 10 | CNTL** | UNUSED | | 22 FIRMWARE BYTES | | | 8 OVERHEAD BYTES |
| FRAME 11 | CNTL** | UNUSED | | 15 FW BYTES | 5 UNSD | CRC16 CRC16 | 8 OVERHEAD BYTES |
| FRAME 12 | CNTL** | UNUSED | | | | | 8 OVERHEAD BYTES |
| FRAME 13 | CNTL** | UNUSED | | | | | 8 OVERHEAD BYTES |
| FRAME 14 | CNTL** | UNUSED | | | | | 8 OVERHEAD BYTES |
| FRAME 15 | CNTL** | UNUSED | | | | | 8 OVERHEAD BYTES |

FIG. 7
CNTL BYTE VALUES: OLU FWDH TO ONT FWDH

| SOM | 00000000 | START OF MESSAGE |
| MOM | 11110000 | MIDDLE OF MESSAGE |
| EOM | 00001111 | END OF MESSAGE |
| IDLE | 00110011 | NOT SENDING MESSAGE |
| REXMT | 11001100 | SENDING TRANSMITTED PACKETS |
| RFWC | 11111111 | RECEIVED FIRMWARE COMPLETE |
| ERRCOD | 10101010 | ERROR CODE TO REINITIALIZE DOWNLOAD |

FIG. 8
FRAME FORMAT FOR ONT FWDH TO OLU FWDH COMMUNICATIONS

| CNTL | LENGTH | CORRUPTED DATA PACKET ADDRESSES | 8 OVERHEAD BYTES |

FIG. 9
CNTL BYTE VALUES: ONT FWDH TO OLU FWDH

| IDLE | 00110011 | NOT SENDING MESSAGE |
| DEAP | 11001100 | SENDING PACKET ADDRESSES FOR RETRANSMIT |
| FWC | 11111111 | FIRMWARE DOWNLOAD COMPLETE |
| RRFWC | 00000000 | RECEIVED THE RECEIVED FIRMWARE COMPLETE |

FIG. 10

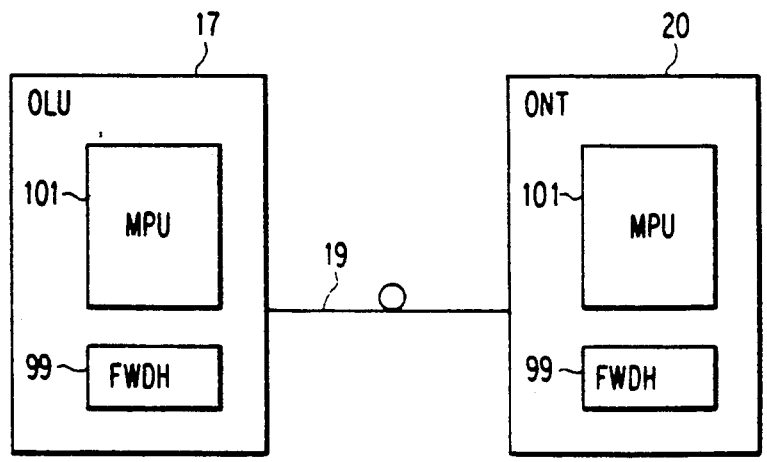

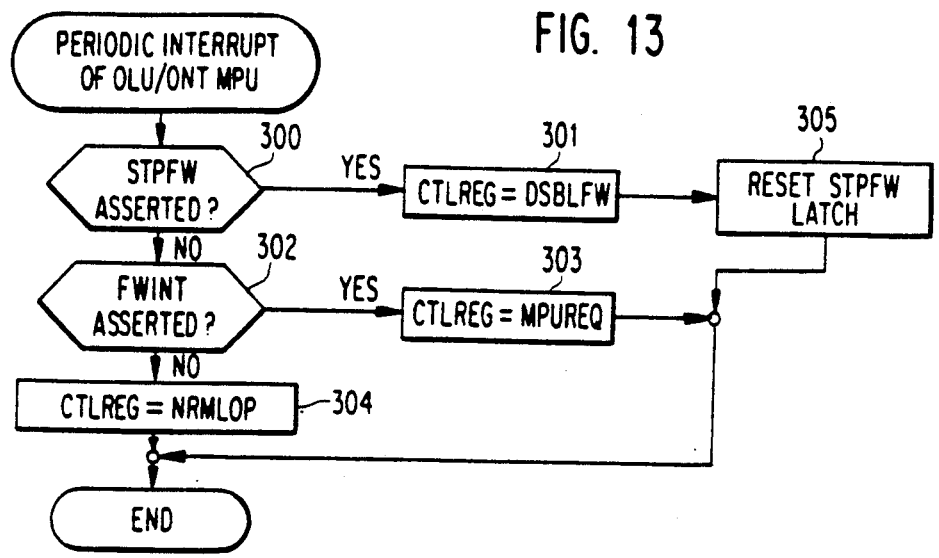
FIG. 13
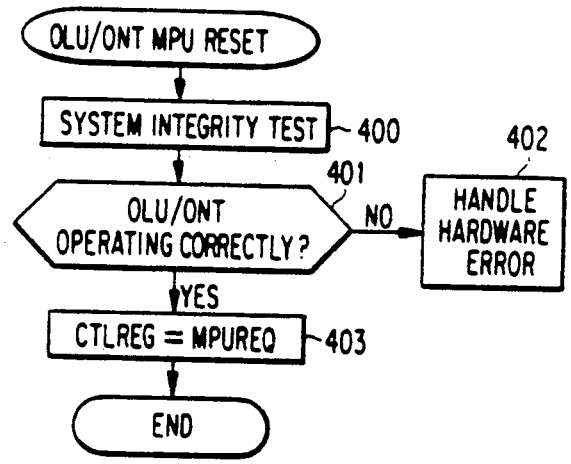
FIG. 14
FIG. 15
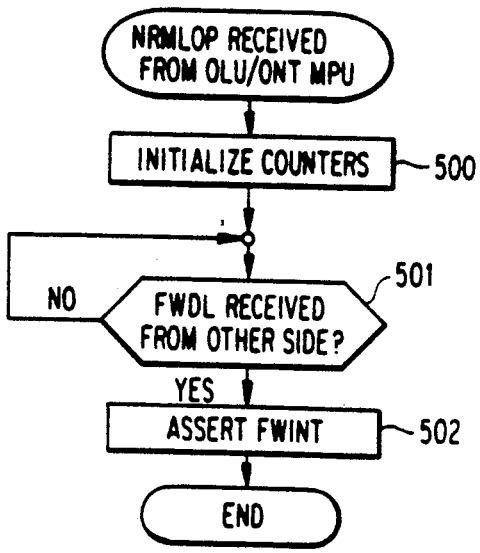
FIG. 16
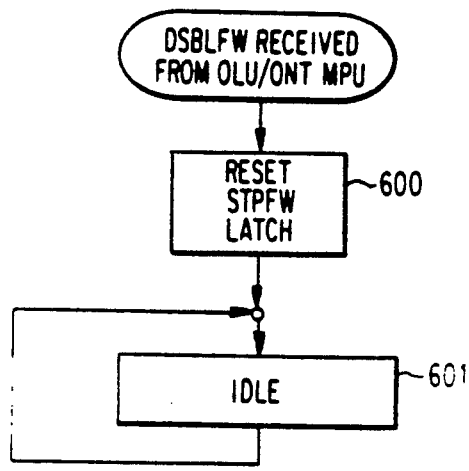

FIRMWARE DOWNLOAD FROM A REMOTE TERMINAL TO AN OPTICAL NETWORK TERMINAL IN A DIGITAL LOOP CARRIER SYSTEM

FIELD OF THE INVENTION

The present invention relates to telecommunications networks.

BACKGROUND OF THE INVENTION

In a public switched telephone network (PSTN), an electronic switching machine at the central office (CO) switches and routes telephone calls to the end telephone user (subscriber). In the past, each subscriber was connected to the CO by an individual pair of copper wires. As the number of subscribers grew, the number of wires between them and the CO grew accordingly. In modern networks, the number of wires or fiber-optic cables needed to service a group of individual subscribers can be reduced by multiplexing a group of subscribers' communications over one line. That is, each individual subscriber's communication is assigned a unique channel which is then combined with the channels from other subscribers and transmitted on the transmission link. Each transmission link has a maximum number of channels which can be handled simultaneously.

The number of transmission links necessary to service a group of subscribers can further be reduced by using a process called concentration. In concentration, more subscribers than the transmission link is physically capable of handling are connected to an electronic concentrator. Because it is statistically unlikely that all of the subscribers will actually use their telephones at the same time, the concentrator is able to select only those which are in use, the number of which is probably less than o equal to the maximum capability of the multiplexed transmission link, and connect them to the transmission link.

The multiplexing and concentration functions are typically performed by electronic equipment which is located between the CO and the subscriber. This equipment is referred to as a remote terminal (RT). In addition to the multiplexing and concentration functions, some of the more sophisticated RTs are also capable of receiving and processing some of the CO switching machine's work in order to reduce the latter's workload. As the cost of electronics and optical fiber decreases, and the demand for services that require greater transmission bandwidth than can be offered over traditional copper telephone lines increases, the RTs are moved ever closer to the subscriber. It is expected that an RT will eventually become the multiplexing and concentration site for a number of smaller RTs that are located at the subscriber's premises. These smaller RTs will be comprised of Optical Network Terminals (ONTs), which allow optical fiber to link the subscriber's premises with the RT.

The RTs and ONTs are all typically controlled by software and/or firmware, so that system faults can be corrected, and enhancements added, without extensive hardware replacement. Despite the efficiencies gained by this implementation, however, it would still be very expensive to send a repair person to each subscriber location in order to install new firmware into the subscriber's ONT.

Consequently, it is an object of the present invention to provide a mechanism which allows the new ONT firmware to be downloaded to a group of ONTs from a common location (e.g., the CO or the RT), using the transmission link that is commonly used for subscriber communication.

It is a further object of the present invention to provide a mechanism which allows the ONT to initiate the firmware download operation by signalling to the RT via an overhead channel which is not used for conveying subscriber communications.

It is still a further object of the present invention to provide a mechanism which allows the RT to initiate the firmware download operation by signalling to the ONT via an overhead channel which is not used for conveying subscriber communications.

It is still a further object of the present invention to convey the firmware from the RT to the ONT in a format which is compatible with the format normally used for conveying subscriber communications via the communications link.

It is still a further object of the present invention to download firmware from the RT to the ONT in a format which simplifies the hardware which performs the download operation.

It is still a further object of the present invention to detect transmission errors which corrupt the firmware transmitted by the ONT.

It is still a further object of the present invention to provide for the retransmission of those portions of the firmware which were corrupted in the transmission process.

It is still a further object of the present invention to provide a timeout mechanism to prevent a communication "lock-up" between the RT and ONT due to a hardware failure during the transmission and handshaking portion of firmware download.

SUMMARY OF THE INVENTION

In accordance with the invention, a remote terminal (RT) and an optical network terminal (ONT) each contain a microprocessor unit (MPU). Subscriber communications between the RT and the ONT are controlled by their respective MPUs, and are sent via a communications link which may be a fiber optics line using the standard CEPT1 2.048 Mbit/s format (see "Functional Characteristics of Interfaces Associated with Network Nodes," CCITT Blue Book, Fascicle III.3—Rec. G.704, 1988) where the signal is divided into 32 64-kbit/s channels. Because the link between the RT and the central office (CO) uses a standard DSI signal format (see "American National Standard for telecommunications—digital hierarchy—formats specifications," American National Standards Institute, ANSI T1.107-1988, 1988) consisting of only 24 64-kbit/s channels, the maximum bandwidth that may be utilized for subscriber communications between the ONT and the CO is 1.536 Mbit/s (=24 times 64-kbit/s). The unused capacity on the link between the RT and ONT is used for overhead communications between the RT and the ONT, and is comprised of 8 64-kbit/s channels.

In accordance with the invention, the firmware which controls the normal operation of the ONT may be downloaded from the RT via the communications link which is normally used for subscriber communications. The firmware download operation is performed by special hardware which is controlled by a Firmware Download Controller (FWD).

The firmware download operation may be initiated at either the RT or the ONT, and is accomplished by sending a Firmware Download (FWDL) command to the other side via one of the overhead channels (CEPT1 time slots 25–31). The format of the FWDL command contains a parity bit to detect errors in transmission. In addition, the FWDL must be active for at least two consecutive CEPT1 frames before the download process is initiated. In this way, false firmware download requests, resulting from errors in transmission, can be avoided.

The side which receives the FWDL command acknowledges that it is ready to begin the firmware download operation by sending a FWDL command back to the other side. This communication also takes place via one of the overhead channels.

The actual transmission of the firmware from the RT to the ONT takes place over the 24 channels that are normally used for subscriber communication. This is possible because the situations where it would be necessary to update the firmware in the ONT are typically ones where no subscriber traffic could be carried. A typical example is the powerup of the equipment at either end of the fiber. By using the 1.536 Mbit/s payload capacity of the RT to ONT link, a significantly faster download of firmware is possible than if one of the overhead channels had been used.

In accordance with the invention, a protocol is defined, using a standard PCM frame format. By using this format, the need for a protocol framing pattern (flag), such as that used in HDLC, is eliminated. Without flags, the need for techniques like bit-stuffing, which are used to prevent data from emulating flags, is also eliminated.

In the preferred embodiment, a standard CEPT1 16 frame multiframe is selected as the frame format. A multiframe is a group of 16 consecutive frames in the CEPT1 format that can be uniquely identified by a multiframe alignment signal in Channel 0. Other PCM frame formats which could have been selected are the DS1 24-frame multiframe, the DS2 frame, the DS3 frame, and the SONET frame.

The protocol of the present invention allows the two sides to detect when the firmware transmission has started, what the address is of the firmware contained in each transmitted data packet, when the last data packet containing firmware has been transmitted, and also when an error has occurred in the transmission of any of the data packets. A packet control byte, included in every data packet, indicates the nature of the packet. In order to prevent a transmission error from erroneously changing one control byte into another, the set of control words which are utilized in the packet control byte were selected so that a Hamming distance of at least 4 exists between all code words.

The detection of other transmission errors is accomplished by the use of a 16-bit cyclic redundancy check (CRC16) code word with the transmission of every data packet. The CCITT version of the CRC16 (see "Interface Between Data Terminal Equipment (DTE) and Data Communication-Termination Equipment (DCE) for Terminals Operating in the Packet Mode and Connected to the Public Data Network by Dedicated Circuit," CCITT Blue Book, Fascicle VIII.2—Rec. X.25, 1988) was chosen, because it has been shown that its predicted error detection capabilities are superior to that of other standard CRC16 codes (see K. A. Witzke and C. Leung, "A Comparison of Some Error Detecting CRC Code Standards," IEEE Trans. Commun., vol. COM-33, pp. 996–998, Sept. 1985). A CRC16 can detect error bursts of at least 16 bits and has a probability of failing to detect errors in completely random 65535-bit strings of at least 1/65536 (see D. Bertsekas and R. Gallager, *Data Networks,* Englewood Cliffs, N.J.: Prentice-Hall, p.57, 1987).

When an error in firmware transmission is detected, the present invention provides a selective repeat automatic retransmission request (ARQ) protocol for requesting the retransmission of only those data packets which were received with errors during their last transmission. For hardware simplicity the transmissions and retransmission requests are sent in a half-duplex mode. No retransmission requests are sent to the RT until the ONT has received an "end of message" indication. Each retransmission request contains the packet number of each packet that was received with errors. These addresses are ordered by address number size, with the largest number addresses sent first. The RT then retransmits these packets in order, with the lowest number address packet transmitted first. The ONT retains a copy of the retransmitted packet numbers that it is expecting, and each of the packets that is successfully retransmitted is removed from the list of corrupted packets. Retransmitted packets that are received with errors again have their packet numbers returned to the "corrupted packet" list. Once the RT has completed the first retransmission of corrupted packets, the ONT sends a new packet requesting the retransmission of any packets that still haven't been correctly received. Once all packets have been correctly received by the ONT, it sends a packet to the RT indicating the transmission is complete.

The primary criteria for the protocol of the present invention are high reliability and simplicity for hardware implementation. Efficiency is of less concern as long as firmware of 64 kbytes or less can be transmitted in less than one second. Accordingly, the protocol of the present invention packs 256 bytes of firmware into each data packet, despite the fact that each CEPT1 16-frame multiframe is capable of carrying 379 payload bytes ($(16 \times 24) - 5$ control bytes). With this selection, the number of payload bytes in each data packet is an even power of 2. This allows much added efficiency in the hardware implementation, and some added transmission efficiency. Because the firmware in each packet will be stored in the memory at the destination in a byte address that is modulo 256 away from the address of the location where the previous and following packet are stored, fewer bits are needed for the address information in the hardware address generator circuits and packet overhead to map it between the proper source and destination location memory locations.

Other objects, features and advantages of the invention will become apparent from the following particular description of a preferred embodiment of the invention.

BRIEF DESCRIPTION OF THE DRAWINGS

FIG. 4 shows the format of the FWDL command issued by the OLU FWDH on Channel #28.

FIG. 5 shows the format of the FWDL command issued by the ONT FWDH on Channel #28.

FIG. 6 shows the format of a data frame, containing transmitted firmware, that would be sent from an OLU FWDH to an ONT FWDH.

FIG. 7 is a table of CNTL byte values in an OLU FWDH to ONT FWDH multiframe.

FIG. 8 shows the format of a data frame that would be sent from an ONT FWDH to an OLU FWDH.

FIG. 9 is a table of CNTL byte values in an ONT FWDH to OLU FWDH data frame.

FIG. 10 schematically illustrates the hardware involved in a firmware download operation.

FIG. 13 illustrates the "Periodic Interrupt of OLU-/ONT MPU" routine for the MPU.

FIG. 14 illustrates the "OLU/ONT MPU Reset" routine for the MPU.

FIG. 15 illustrates the "NRMLOP Received from OLU/ONT MPU" state transition diagram for the FWDH.

FIG. 16 illustrates the "DSBLFW Received from OLU/ONT MPU" state transition diagram for the FWDH.

DETAILED DESCRIPTION OF THE PREFERRED EMBODIMENT

A. System Architecture

Figure 1:
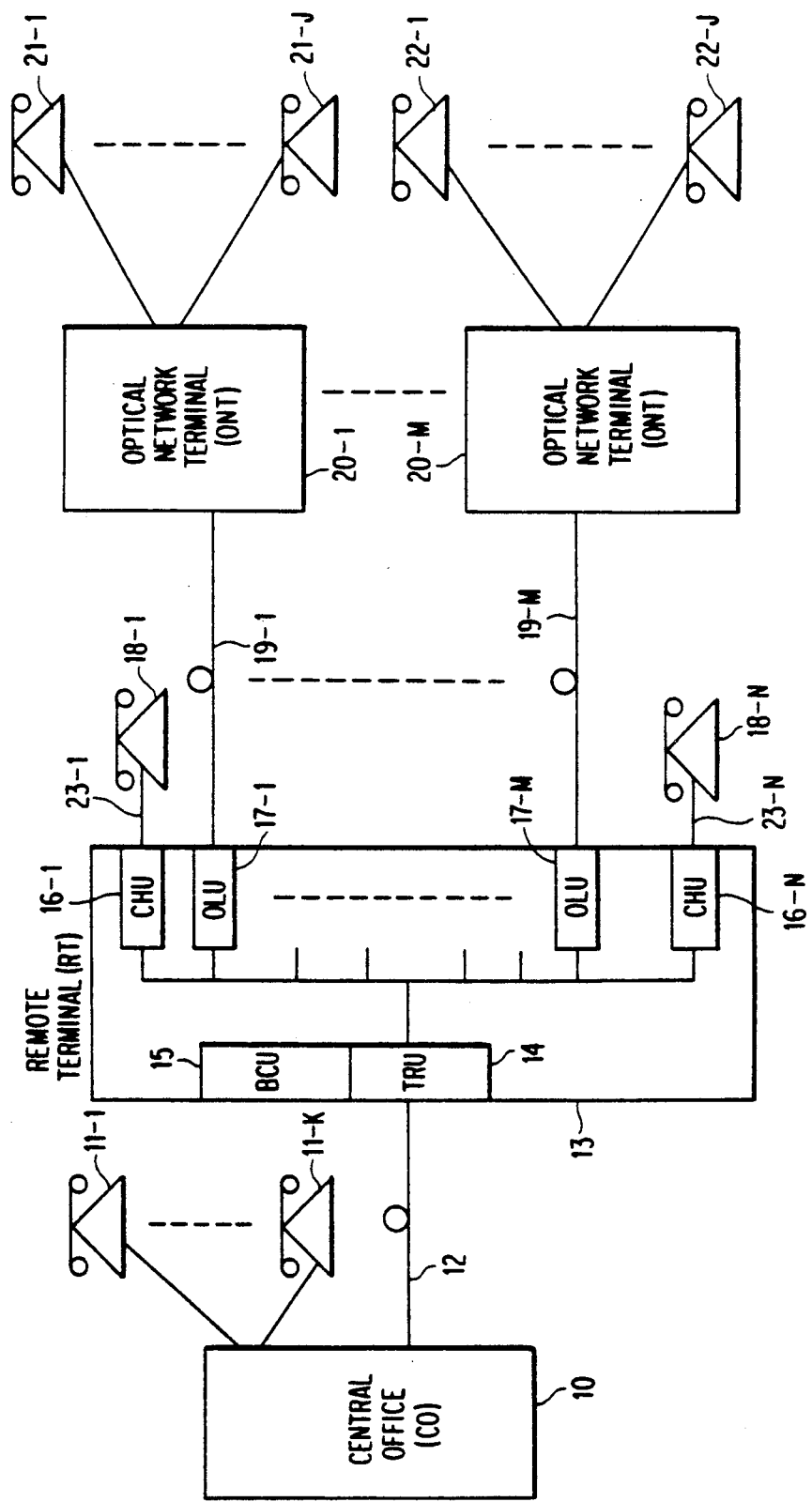
FIG. 1 illustrates a public switched telephone network which includes a central office, a remote terminal, and several optical network terminals capable of having their firmware downloaded from the remote terminal in accordance with an illustrative embodiment of the present invention.

A public switched telephone network (PSTN) in which the present invention would operate is illustrated in FIG. 1. The central office (CO) 10 is used for the switching and routing of telephone calls. Service may be provided directly to end users (subscribers) 11-1, . . . 11-K, or electronic equipment may be placed between the CO 10 and the subscribers. This intermediate electronic equipment is called a remote terminal (RT) and is shown in FIG. 1 as RT 13. Although only one RT is illustrated in FIG. 1, it should be readily apparent that a multiple number of RTs could be connected to a single CO 10.

The primary purpose of RT 13 is to perform the functions of multiplexing and concentration. In this manner, many individual subscribers 18-1, . . . 18-N, 21-1, . . . 21-J, 22-1, . . . 22-J may share a single CO-to-RT transmission link 12 between the CO 10 and the RT 13. CO-to-RT transmission link 12 can carry 24 64 kbit/s channels in a standard DS1 signal format, for a total bandwidth of 1.536 Mbit/s.

The RT 13 is comprised of a transmit and receive unit (TRU) 14, a bank control unit (BCU) 15, a number of channel units (CHU) 16-1, . . . 16-N, and a number of optical line units (OLU) 17-1, . . . 17-M. The TRU 14 performs the time division multiplexing and demultiplexing of the digital signals coming from and going to the CHUs 16-1, . . . 16-N, and the OLUs 17-1, . . . 17-M. The BCU 15 handles the software or firmware that performs system maintenance and provisioning for the RT 13. The BCU 15 also handles the software for each CHU 16-1, . . . 16-N and each OLU 17-1, . . . 17-M.

The CHUs 16-1, . . . 16-N provide an analog interface to the wire pair 23-1, . . . 23-N connecting the RT 13 to the subscriber 18-1, . . . 18-N. The CHUs 16-1, . . . 16-N also perform the conversions between the analog signals that are sent between the RT 13 and the subscribers 18-1, . . . 18-N and the digital signals that are transmitted between the CO 10 and the RT 13.

The optical line units (OLU) 17-1, . . . 17-M are special channel units that extend the local loop further to the optical network terminals (ONT) 20-1, . . . 20-M. The OLUs 17-1, . . . 17-M connect the RT 13 to the ONTs 20-1, . . . 20-M through fiber optic cables (OLU-to-ONT transmission links) 19-1, . . . 19-M. These OLU-to-ONT transmission links 19-1, . . . 19-M use the standard CEPT1, 2.048 Mbit/s format in which the signal is divided into 32 64-kbit/s channels. Not all of this bandwidth can be used for subscriber communications because these communications must also traverse the CO-to-RT transmission link 12, which can only carry 24 64-kbit/s channels. The remaining bandwidth (channels 25 to 32) on the OLU-to-ONT transmission links 19-1, . . . 19-M is used for system overhead communications.

The ONTs 20-1, . . . 20-M are small remote terminals that are located at the subscriber's premises. Like the RT 13, the ONTs 20-1, . . . 20-M perform multiplexing and concentration so that many subscribers, such as subscribers 21-1, . . . 21-J and subscribers 22-1, . . . 22-J, may share a single transmission link, such as 19-1 and 19-M respectively. Also like the RT 13, the ONTs 20-1, . . . 20-M are controlled by some type of software or firmware so that system faults and enhancements can be handled without extensive hardware replacement. However, with the ONTs 20-1, . . . 20-M being located at each subscriber's premises, the cost of sending a repair person to each location to install new firmware is very high.

The present invention solves this problem by allowing the OLUs 17-1, . . . 17-M to download firmware to the ONTs 20-1, . . . 20-M over the RT-to-ONT transmission links 19-1, . . . 19-M. The hardware for performing this function is contained in each OLU 17-1, . . . 17-M and each ONT 20-1, . . . 20-M.

B. Overview of Communications Protocol and Data Formats

The ability to download firmware from an OLU 17-1, . . . 17-M to an ONT 20-1, . . . 20-M is a programmable option controlled by a microprocessor (MPU 101) on the OLU 17 (OLU MPU) and a microprocessor (MPU 101) on the ONT 20. The actual transfer is performed by special firmware download hardware (FWDH 99) which also resides on each OLU 17-1, . . . 17-M and ONT 20-1, . . . 20-M. Although the FWDH 99 performs different operations depending on whether it is sending firmware (FWDH 99 on the OLU 17) or receiving firmware (FWDH 99 on the ONT 20), in the preferred embodiment the hardware is the same on both sides, and is controlled by its respective MPU in the same manner.

Figures 2, 3:
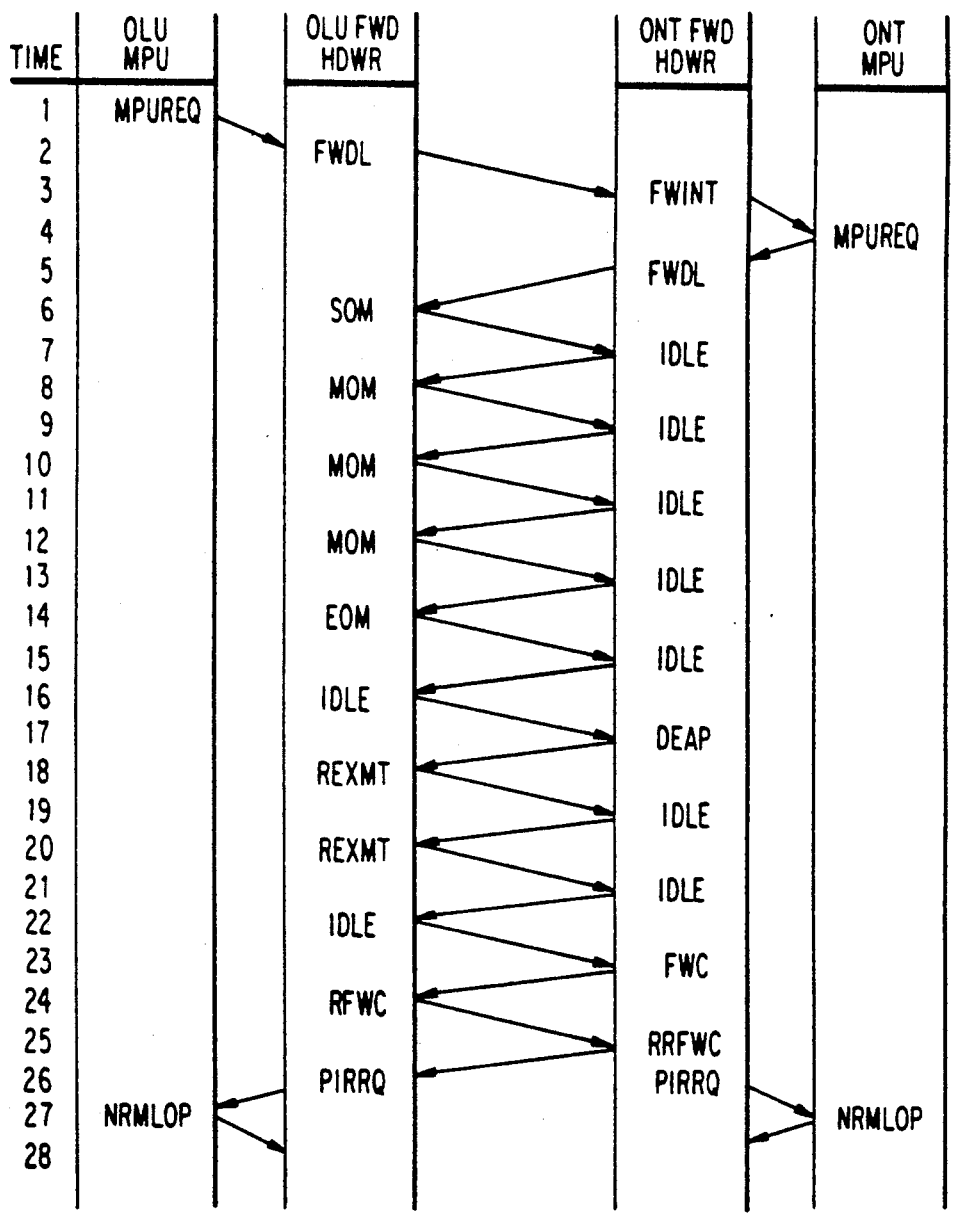
FIG. 2 illustrates the communications protocol that downloads firmware from an optical line unit to an optical network terminal in accordance with the present invention.
FIG. 3 is a table of commands issued by the OLU-/ONT MPU to the OLU/ONT firmware download hardware.

Communication between each MPU and its corresponding FWDH is performed through dedicated hardware control registers. The MPU 101 instructs its FWDH 99 (either on the OLU 17 or the ONT 20) by writing commands to a control register, CTLREG 106. Valid commands are shown in FIG. 3. The MPUREQ command instructs the FWDH 99 to begin the firmware download process ("send firmware" if it is on an OLU 17, or "receive firmware" if it is on an ONT 20). When the firmware download process has been completed, the MPU 101 may issue the NRMLOP command in order to reinitialize its FWDH 99 so that it may respond to requests for firmware download issued by the other side. The MPU 101 may also issue the DSBLFW command which instructs its FWDH 99 to ignore any requests, sent by the other side, for firmware download to begin. The DSBLFW command is normally only issued by the OLU 17-1, . . . 17-M, and only when it has determined that due to problems encountered during previous attempts to download firmware to the ONT 20-1, . . . 20-M, further attempts would be useless.

Each FWDH 99 sends messages back to its MPU by setting or resetting two flags. One of these is the FWINT latch 104. The FWINT latch 104, when set, informs the MPU 101 that the FWDH 99 has received a request from the other side to begin the process of downloading firmware.

The other flag is the STPFW latch 103. The STPFW latch 103 is used by the FWDH 99 on the OLU 17 to inform the MPU 101 that the FWDH 99 on the ONT 20 is receiving too many errors to be able to successfully complete a firmware download operation. As explained above, the MPU 101 on the OLU 17 will respond by writing the DSBLFW command to the CTLREG 106, which will instruct the FWDH 99 on the OLU 17 to ignore any further requests, sent by the FWDH 99 on the ONT 20, for firmware download to begin.

1) Initiation of Firmware Download Operation

The communications protocol of the present invention is illustrated in FIG. 2. At Time=1, the MPU 101 on the OLU 17 initiates a firmware download operation by issuing an MPUREQ to the FWDH 99 on the OLU 17. At Time=2, the FWDH 99 on the OLU 17 responds by sending an FWDL signal to the FWDH 99 on the ONT 20. In the preferred embodiment, this communication is sent via overhead channel 28. The format of the OLU FWDH 99 to ONT FWDH 99 FWDL message is illustrated in FIG. 4. The FWDL request is inserted into overhead alarm bytes. The OLU FWDH 99 sends separate bytes of information on the overhead channel according to the CEPT1 frame number modulus two. The MOD 0 byte is sent during frames 0, 2, 4, 6, 8, 10, 12, and 14, while the MOD 1 byte is sent during frames 1, 3, 5, 7, 9, 11, 13, and 15. The FWDL bit must be active in both bytes before the FWDH 99 on the ONT 20 acknowledges the request. In addition to the bits shown in FIG. 4, a parity bit is inserted in channel 29. If the receiving end does not calculate even parity over the alarm channel, the hardware registers will not be updated. These techniques minimize the probability of transmission errors corrupting the request message.

At Time=3, the FWDH 99 on the ONT 20 responds to the received FWDL request by setting the FWINT latch 104. The FWINT latch 104, as well as the STPFW latch 103, is checked by the MPU 101 during every MPU periodic interrupt (PIR interrupt). Seeing its FWINT latch 104 set informs the MPU 101 on the ONT 20 that the FWDH 99 has received a request from the other side to begin the process of downloading firmware. The ONT MPU 101 responds, at Time=4, by writing MPUREQ to the CTLREG 106. This causes the FWDH 99 on the ONT 20 to send, at Time=5, an FWDL signal to the FWDH 99 on the OLU 17 in order to let the FWDH 99 on the OLU 17 know that the FWDH 99 on the ONT 20 is ready to begin receiving the downloaded firmware.

The FWDL signal sent by the FWDH 99 on the OLU 17 has the format shown in FIG. 5. The FWDH 99 on the OLU 17 sends separate overhead bytes of information according to the CEPT1 frame number modulus four. The MOD 0 byte is sent during frames 0, 4, 8, and 12. The MOD 1 byte is sent during frames 1, 5, 9, and 13. The MOD 2 byte is sent during frames 2, 6, 10, and 14. The MOD 3 byte is sent during frames 3, 7, 11, and 15. The FWDL bit must be active in both bytes before the FWDH 99 on the OLU 17 acknowledges the request. Again, a parity bit is inserted into channel 29 so that the FWDH 99 on the OLU 17 will be able to detect transmission errors which may falsely create the appearance that an FWDL has been received.

At this point, the firmware is ready to be transmitted. Although the illustration shows the MPU 101 on the OLU 17 initiating the download process at Time=1, it should be recognized that the MPU 101 on the ONT 20 could similarly have started the process by writing MPUREQ to its CTLREG 106. This would have caused the FWDH 99 on the ONT 20 to send FWDL to the FWDH 99 on the OLU 17. The FWDH 99 on the OLU 17 would have set its FWINT latch 104 to notify the MPU 101 on the OLU 17 that the FWDH 99 on the ONT 20 was requesting the firmware download process to begin. The MPU 101 on the OLU 17 would have responded by writing MPUREQ to its CTLREG 106. At this point, both sides would be ready to begin actually downloading the firmware.

2) Transmission of Firmware

The remaining communications between the FWDH 99 on the OLU 17 and the FWDH 99 on the ONT 20 use the first 24 channels of the CEPT1 format, rather than the overhead channels (channels 25 through 32). The FWDH 99 on the OLU 17 uses the CEPT1 16-frame multiframe format to transmit firmware to the FWDH 99 on the ONT 20. The FWDH 99 on the ONT 20 signals to the FWDH 99 on the OLU 17 that it either needs certain data packets retransmitted, due to errors received, or that it has successfully received all of the transmitted firmware by using a single 32-byte CEPT1 frame.

The 16-frame multiframe format of the preferred embodiment is illustrated in FIG. 6. This data frame would be sent from the FWDH 99 on the OLU 17 to the FWDH 99 on the ONT 20 in order to transmit a block of 256 bytes of firmware. Each of the 16 frames in the multiframe consists of 32 transmitted bytes. The first byte in Frame 0 is the CNTL byte. For an OLU FWDH 99 to ONT FWDH 99 transmission, the CNTL byte can take on any of the values shown in FIG. 7. Setting CNTL equal to SOM indicates that the data packet is the start of the message containing firmware. That is, it is an indicator that this is the first packet being transmitted that contains firmware. Subsequent data packets have their CNTL byte set to MOM (middle of message), except for the last transmitted data packet, which has its CNTL byte set to EOM. Setting the CNTL byte to EOM lets the FWDH 99 on the ONT 20 know that it has received the last data packet containing firmware.

Bytes 1 and 2 of frame 0 of the SOM, MOM and EOM data packets contain the address of where the firmware contained in the packet should be stored. This is illustrated in FIG. 6 as the ADDR0 and ADDR1 fields. In the preferred embodiment of the invention, each data packet contains 256 bytes. Consequently, the eight least significant bits (LSBs) of the address are not transmitted in the ADDR0 and ADDR1 fields, because they will always be equal to zero. This results in simpler hardware, because fewer bits are needed for the address information in the hardware firmware address generator circuit 154 and in the address extract and compare circuit 151.

The 256 bytes of transmitted firmware are packed into each data packet as illustrated in FIG. 6. Frame 0 contains 21 bytes of this data packet's firmware packed in bytes 4 through 24. In a SOM data packet, the first of these 21 bytes is really a count of the total number of data packets that will be transmitted, but it is stored by the FWDH 99 on the ONT 20 with the rest of the firmware. Frames 1 through 10 each contain 22 bytes of this data packet's firmware packed in bytes 3 through 24 of each frame. Frame 11 contains the last 15 bytes of this data packet's firmware, packed in bytes 3 through 17. Thus, the total number of transmitted firmware bytes is 256 per data packet. Two CRC16 bytes are included in bytes 23 and 24 of frame 11 so that the FWDH 99 on the ONT 20 may be able to detect whether any errors occurred in the transmission.

When all of the firmware has been transmitted, the FWDH 99 on the ONT 20 must let the FWDH 99 on the OLU 17 know whether it has received all of the firmware without error, or whether it needs certain data packets retransmitted. The format of any of these communications is the 32-byte CEPT1 frame illustrated in FIG. 8. The first byte of this frame is a CNTL field which indicates the type of frame that it is. Values that the CNTL byte can take on in a frame sent by the FWDH 99 on the ONT 20 to the FWDH 99 on the OLU 17 are shown in FIG. 9. The first value, IDLE, is the value to which the CNTL field is set when it is not sending a message, as for example, when it is receiving firmware from the FWDH 99 on the OLU 17. When the FWDH 99 on the ONT 20 has received all of the firmware without errors, it will send a frame with the CNTL field set to FWC, to indicate that firmware download is complete. When the FWDH 99 on the ONT 20 receives an acknowledgment from the FWDH 99 on the OLU !7 that its FWC packet has been received, the FWDH 99 on the ONT 20 will respond by sending a frame with the CNTL field set to RRFWC, which means that it has "received the received firmware complete" communication from the FWDH 99 on the OLU 17. None of the other fields in the 32 byte frame are used when the CNTL byte is set to any of the values IDLE, FWC, or RRFWC.

When the FWDH 99 on the ONT 20 detects an error in a received data packet, it stores the packet number. After all of the packets have been transmitted by the FWDH 99 on the OLU 17, the FWDH 99 on the ONT 20 requests retransmission of the corrupted data packets by sending a frame with the CNTL field set to DEAP. This frame will also contain the length and corrupted data packet addresses fields shown in FIG. 8. The length field is one byte long, and contains a count of the number of corrupted packet addresses that need retransmission. Those packet addresses are then contained in the following bytes.

The FWDH 99 on the OLU 17 responds to any of these received 32-byte frames with its 16-frame multiframe. If an FWC has been received, the FWDH 99 on the OLU 17 will transmit a multiframe with the CNTL field of every frame set to RFWC, in order to acknowledge that it has received the firmware complete signal from the FWDH 99 on the ONT 20. If, however, the ONT FWDH has sent a DEAP data packet to the FWDH 99 on the OLU 17, the FWDH 99 on the OLU 17 will retransmit the requested data packets. These packets have the same format as the SOM, MOM and EOM packets, except that the CNTL byte is set to REXMT, in order to indicate that these are retransmitted packets.

If, after sending an EOM packet, the FWDH 99 on the OLU 17 receives only IDLE frames from the FWDH 99 on the ONT 20, it will send a data packet with the CNTL byte set to ERRCOD in an attempt to reinitialize firmware download. The FWDH 99 on the ONT 20 should respond by sending a FWDL signal. Upon receiving the FWDL signal, the FWDH 99 on the OLU 17 will increment error counter 161. If the count is not greater than 3, the firmware download process will begin again from the start. If the count is greater than 3, then the FWDH99 on the OLU 17 will discontinue the download process and set the STPFW latch 103.

If, instead of receiving a FWDL signal from the FWDH 99 on the ONT 20, a timeout occurs on the FWDH 99 on the OLU 17, the FWDH 99 on the OLU 17 will set the STPFW latch 103 and discontinue firmware download.

Use of the described data packet formats is illustrated in FIG. 2. At Time=6 the FWDH 99 on the OLU 17 is ready to begin sending the firmware to the FWDH 99 on the ONT 20. Both the FWDH 99 on the OLU 17 and the FWDH 99 on the ONT 20 will disable the periodic interrupts for their respective MPUs 101. Next, the FWDH 99 o the OLU 17 sends a SOM data packet containing the first 256 bytes of firmware to the FWDH 99 on the ONT 20. Until the SOM data packet is received by the FWDH99 on the ONT 20 at Time=7, the FWDH 99 on the ONT 20 continues to transmit FWDL signals to the FWDH 99 on the OLU 17. When, at Time=7, the FWDH 99 on the ONT 20 receives the SOM packet, it will stop sending the FWDL signal to the FWDH 99 on the OLU 17.

If the FWDH 99 on the OLU 17 detects that the FWDL signal is no longer being received, it interprets this as an indication that it may continue sending the rest of the firmware to the FWDH 99 on the ONT 20. If, on the other hand, the FWDH 99 on the OLU 17 detects, after sending the SOM packet, that it is still receiving FWDL signals from the FWDH 99 on the ONT 20, then it will eventually conclude that the SOM control byte was not recognized by the FWDH 99 on the ONT 20, and that the FWDH 99 on the ONT 20 is still waiting for the SOM packet to arrive. Consequently, the FWDH 99 on the OLU 17 will resend the SOM packet, and increment the error counter 161 to keep track of how many times it had to restart the download process.

The download illustration of FIG. 2 shows a case where the SOM control byte was immediately recognized by the FWDH 99 on the ONT 20 at Time=7. Therefore, at Time=8, 10, and 12 in FIG. 2, the FWDH 99 on the OLU 17 sends three MOM data packets, each containing 256 bytes of firmware. The number of MOM data packets that would have to be sent would actually vary with the specific implementation. For the purpose of illustration, three MOM data packets were shown. At Time=14 in the illustration of FIG. 2, the FWDH 99 on the OLU 17 completes the transmission by sending the final 256 bytes of firmware in a data packet whose CNTL byte is set to EOM.

When the EOM packet is received by the FWDH 99 on the ONT 20, it knows that it must tell the FWDH 99 on the OLU 17 whether or not all of the data packets were received without error. For the purpose of example only, FIG. 2 illustrates a case where two of the data packets need to be retransmitted. At Time=17, the FWDH 99 on the ONT 20 sends a DEAP data frame to the FWDH 99 on the OLU 17. Referring back to FIG. 8, the "length" field in the DEAP frame would be set to 2 in this illustration, and the "corrupted data packet addresses" field would contain the addresses of the two packets in which the FWDH 99 on the ONT 20 detected errors.

Having received the DEAP frame, the FWDH 99 on the OLU 17 retransmits the two requested data packets. This is shown in FIG. 2 at Time=18 and Time=20. The FWDH 99 on the OLU 17 then waits for the response from the FWDH 99 on the ONt 20, telling it whether these retransmitted packets were received without error.

FIG. 2 illustrates a case where the two retransmitted packets were received without error. Consequently, at Time=23, the FWDH 99 on the ONT 20 transmits a FWC frame to the FWDH 99 on the OLU 17, in order to indicate that all of the firmware has been received. Upon receiving the FWC frame, the FWDH 99 on the OLU 17 sends, at Time=24, a packet with the CNTL byte set to RFWC, in order to tell the FWDH 99 on the ONT 20 that the FWC frame was received. The FWDH 99 on the ONT 20 responds, at Time=25, by sending an RRFWC packet back to the FWDH 99 on the OLU 17 in order to indicate that the RFWC packet was received.

When the RRFWC frame is received by the FWDH 99 on the OLU 17, it notifies its MPU 101 that the firmware download process is complete by allowing the MPU's 101 periodic interrupts to occur again. This is illustrated in FIG. 2 at Time=26. Similarly, the FWDH 99 on the ONT 20 notifies the MPU 101 on the ONT 20 that the firmware download process is complete by allowing the MPU's 101 periodic interrupts to occur again. When these interrupts occur, both MPUs will find the FWINT latch 104 and STPFW latch 103 reset, indicating that all went smoothly. The response of both MPUs would be to write NRMLOP into their respective CTLREGs 106 (illustrated in FIG. 2 at Time=27), so that the FWDH 99 on the OLU 17 and the FWDH 99 on the ONT 20 will both be able to respond to any subsequent firmware download requests sent by the other side.

C. Hardware Description

In the preferred embodiment of the invention, the hardware necessary to perform the firmware download operation is identical in the OLU 17 and the ONT 20. This hardware is shown schematically in FIG. 10. An OLU 17 is shown containing an MPU 101 and the FWDH 99. A fiber optic cable 19 links the OLU 17 with an ONT 20. The ONT 20 contains its own MPU 101 and FWDH 99.

Figure 11A:
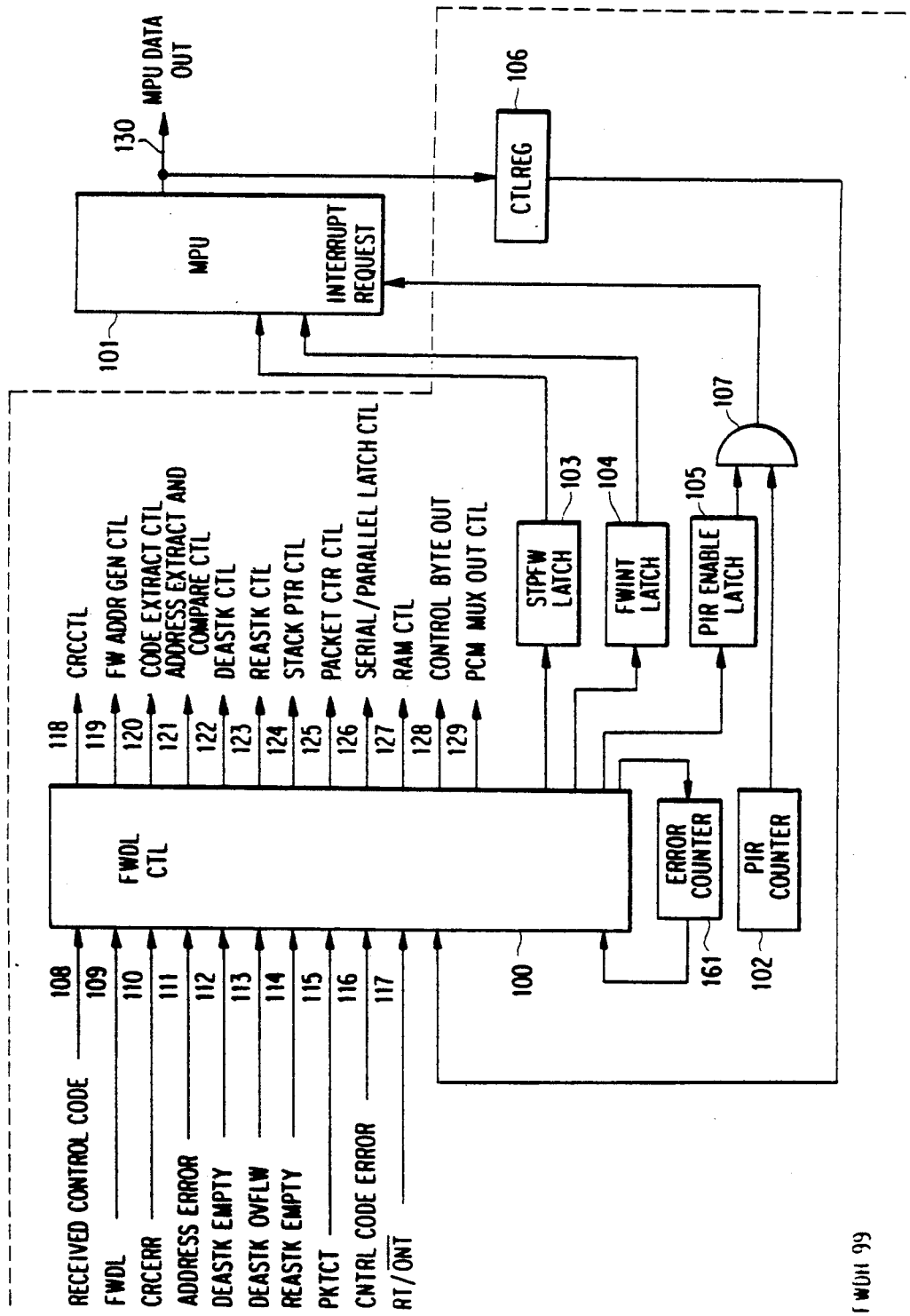
FIGS. 11a and 11b show the hardware embodied in the FWDH, and its connection to an MPU.
Figure 11B:
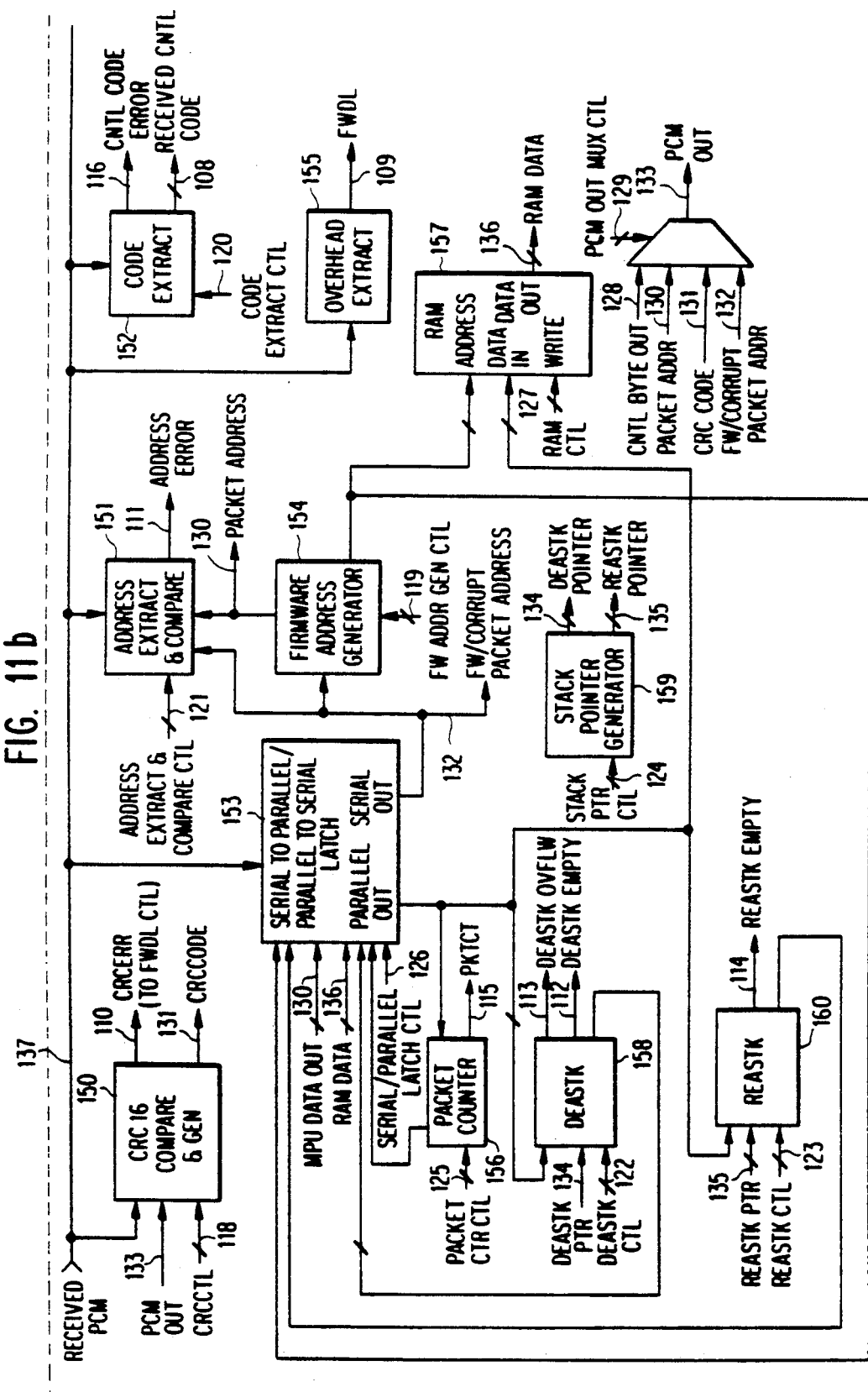

FIGS. 11a and 11b show a more detailed block diagram of the hardware contained in the FWDH 99. An MPU 101 is also illustrated in FIG. 11a so that the relevant interface between it and the FWDH 99 may be shown.

FIG. 11a shows the hardware by which the FWDH 99 communicates with the MPU 101. PIR generator 102 generates a signal (PIR interrupt) every 6 msec which is used to interrupt the MPU 101. The FWDH 99 may prevent this interrupt from occurring by resetting the PIR enable latch 105, since the output of this latch is ANDed with the PIR generator signal through AND gate 107. The PIR interrupt is enabled by setting the PIR enable latch 105.

When the MPU 101 does take a PIR interrupt, it examines the outputs of the STPFW latch 103 and the FWINT latch 104. If both latches are reset, then the MPU 101 takes no action with regard to any firmware download operation. If the FWINT latch 104 is set to one, then the MPU 101 knows that the FWDH 99 has received a request for a firmware download operation from the other side. If the STPFW latch 103 is set, then the MPU 101 knows that the FWDH 99 encountered too many problems with an attempted firmware download operation.

The MPU 101 communicates with the FWDH 99 by writing commands into the CTLREG 106. A list of valid commands is shown in FIG. 3. The meaning of these commands was described in the section on Communications Protocol and Data Formats.

The FWDH 99 is controlled by the FWDL CTL 100 hardware. This hardware generates all of the control signals for the FWDH 99. As previously stated, the FWDH hardware in the preferred embodiment of the invention is identical in both the OLU 17 and the ONT 20. The operation of the FWDH varies, however, depending on where it is installed. In order to accommodate the differences in operation, the FWDL CTL 100 has, as one of its inputs, a signal, RT/NOT ONT 117, which tells the FWDL CTL 100 what type of machine it is installed in. By using the RT/NOT ONT 117 signal, the appropriate set of control signals are generated for the FWDH 99.

FIG. 11b illustrates the remainder of the hardware embodied in the FWDH 99. The received pulse code modulation (PCM) signal 137 is the input bit stream from the fiber optic cable 19 which contains the data frames described in the section entitled Overview of Communications Protocol and Data Formats. The PCM out 133 signal is the bit stream that goes onto the fiber optic cable 19 for transmission to the other side.

The CRC16 Compare & Generator 150 hardware serves different purposes, depending on whether the FWDH 99 is installed in an OLU 17 or an ONT 19. In an OLU 17, the CRC16 Compare & Generator 150 is responsible for generating the CRCCODE 131 which will be sent in the data packet that goes out on PCM out 133. In an ONT 20, the CRC16 Compare & Generator 150 examines the data packet bit stream arriving on Received PCM 137, recalculates the CRC code, compares the recalculated code to the received code, and asserts the signal CRCERR 110 when a CRC error is detected. The existence of a CRC error means that the data contained in the incoming data packet has been corrupted in the transmission process.

The Address Extract & Compare 151 is used only when the FWDH 99 is installed in an ONT 20. Its purpose is to extract the data packet bits representing the address for the firmware being received on the Received PCM 137, and to compare the received address with the expected address generated by the Firmware Address Generator 154. If the Address Extract & Compare 151 detects a non-match between the two addresses, then the signal, Address Error 111, is asserted.

The Code Extract 152 hardware is used on both the ONT 20 and the OLU 17 side of the transmission. The Code Extract 152 extracts the data packet bits representing the CNTL byte for the data frame being received on the Received PCM 137. The Received Control Code 108 is used by the FWDL CTL 100 for determining the next state of the FWDH 99. The Code Extract 152 also detects invalid received codes, and asserts the signal Cntrl Code Error 116 when one is found. When the FWDH 99 is installed in an ONT 20, valid values for the Received Control Code 108 are shown in FIG. 7. When the FWDH 99 is installed in an OLU 17, valid values for the Received Control Code 108 are shown in FIG. 9. In both instances, the values for the valid Control Codes were chosen so that a minimum Hamming distance of 4 exists between any two codes. This helps prevent a corrupted control code from going undetected by the Code Extract 152 hardware.

The Serial to Parallel/Parallel to Serial latch 153 is used by the FWDH 99 for converting from serial bit stream data, received from the Received PCM 137, into parallel data which may then be saved in registers on the FWDH 99. The Serial to Parallel/Parallel to Serial latch 153 also converts parallel data, found on the FWDH 99 itself, into serial bit stream data which can be transmitted on the PCM out 133 line.

The Firmware Address Generator 154 serves several functions. On an ONT 20, it generates the next expected packet address to be received. This value is compared with the actual received address in the Address Extract & Compare 151 hardware. The Firmware Address Generator 154 also generates the full RAM address which is used for storing the received firmware into th RAM 157. This is necessary, because the address received in the data packet do not contain the least significant 8 bits. The reason for this is that since the firmware packets are always received in 256 byte blocks, which is an even power of 2, it is unnecessary to transmit them. In addition, the size of RAM 157 may be such that most significant bits (MSBs) may also need to be appended to the received packet address in order to store the firmware into the correct RAM 157 location.

When the Firmware Address Generator 154 is installed in an OLU 17, it is responsible for generating the Packet Address 130 which gets transmitted as part of the data packet on PCM Out 133. The Firmware Address Generator 154 also generates the full RAM address which is used for reading the firmware that is to be transmitted from the RAM 157. This is necessary, because the data packet address that will be sent does not contain the least significant 8 bits. As explained above, the reason for this is that since the firmware packets are always received in 256 byte blocks, which is an even power of 2, it is unnecessary to transmit them. In addition, the size of RAM 157 may be such that most significant bits (MSBs) may also need to be appended to the received packet address in order to access the firmware from the correct RAM 157 location.

The Overhead Extract 155 hardware is utilized, on both the OLU 17 and ONT 20 sides, for monitoring the overhead channels. Specifically, it looks at Channel #28 (and Channel #29 for parity) to see if a firmware download request has been received from the other side. If one is detected, it asserts the signal FWDL 109. Although the function of the Overhead Extract 155 hardware is the same whether it is installed in an OLU 17 or an ONT 20, the format of the firmware download request received from an OLU 17 is different from one received from an ONT 20. FIGS. 4 and 5 illustrate the format of the firmware download request when it is received, respectively, from an OLU 17 and an ONT 20.

The packet counter 156 is used only when it is installed in an OLU 17. Its function is to keep track of how many more data packets need to be sent to the ONT 20.

The DEASTK 158 and REASTK 160 are stacks which are used in the implementation of the selective automatic repeat request (ARQ) error recovery system. When a data packet is received at the ONT 20, the packet address is pushed onto the DEASTK 158. If the received data packet is found to contain corrupted data, then the FWDH 99 distinguishes between two levels of errors. Receiving an invalid control word is classified as a major error, as is having the received packet address not match the expected packet address without a CRCERR 110 being generated. A major error causes the packet address to be popped off of the DEASTK 158. At this point, the FWDH 99 on the ONT 20 sends an FWDL message, via the overhead channels, back to the FWDH 99 on the OLU 17 side. Receipt of the FWDL message forces the OLU 17 to increment the error counter 161 and reinitialize firmware download. The FWDH 99 on the ONT 20 will then reinitialize the hardware circuits and monitor the received PCM 137 for the start of the message control word (SOM). The firmware download operation then continues as normal.

If the error discovered in the data packet is classified as minor, such as a CRCERR 110, then the saved packet address remains on the DEASTK 158. If the DEASTK 158 has not overflowed after the EOM packet has been received from the OLU 17, the FWDH 99 on the ONT 20 builds the DEAP data frame (see FIGS. 8 and 9) by popping the corrupted packet addresses off of the DEASTK 158. Besides inserting these addresses into the PCM Out 133 data stream, these addresses are also pushed onto the REASTK 160. The ONT 20 will then know which data packets to expect during retransmission. As the retransmitted data packets are received, the addresses are popped off of the REASTK 160 and into the Firmware Address Generator 154, so that they may be compared with the received packet address. After the last retransmitted data packet has arrived without errors, both the DEASTK 158 and the REASTK 160 will be empty.

If while receiving data packets a DEASTK OVFLW 113 occurs, the FWDH 99 on the ONT 20 must pop all addresses off of the DEASTK 158, and start the firmware download operation all over again. This is necessary because the FWDH 99 on the ONT 99 was unable to keep track of all of the corrupted data packets that needed to be retransmitted. Reinitiation of the firmware download procedure is accomplished by sending an FWDL message, via the overhead channels, back to the FWDH 99 on the OLU 17 side. Receipt of the FWDL message forces the OLU 17 to reinitialize firmware download. The FWDH 99 on the ONT 20 will then reinitialize the hardware circuits and monitor the received PCM 137 for the start of the message control word (SOM). The firmware download operation then continues as normal.

On the OLU 17 side, the corrupted packet addresses which are received in a DEAP frame are pushed onto the REASTK 160. The packet addresses are then popped, one at a time, off of the REASTK 160 and into the Firmware Address Generator 154 so that the appropriate packet of 256 firmware bytes may be retrieved from the RAM 157, and retransmitted to the ONT 20 in a REXMT data packet (see FIGS. 6 and 7). When the last packet address has been popped off of the REASTK 160, and the last REXMT data packet transmitted, the FWDH 99 on the OLU 17 will move into the IDLE state and wait for acknowledgement from the ONT 20.

The Stack Pointer Generator 159 maintains the stack pointers for the DEASTK 158 and the REASTK 160.

The RAM 157 is a random access memory which is the source of the firmware on the OLU 17 side, and is the destination of the received firmware on the ONT 20 side.

The multiplexor 161 selects from among various bit stream sources in order to build the various data packets which go out on the PCM Out 133 line for transmission to the other side.

D. Operation of the Hardware

Operation of the FWDH 99 on the OLU 17 side as well as the ONT 20 side is shown in the state transition and flow diagrams depicted in FIGS. 12 through 17. These diagrams will now be explained in more detail.

1) "MPUREQ from OLU MPU" (FIGS. 12a, 12b, 12c, 12d, 12e)

The "MPUREQ from OLU MPU" state transition diagram (FIGS. 12a, 12b, 12c, 12d, and 12e) illustrates the operation of an FWDH 99 which is located on an OLU 17, after the MPU 101 has written an MPUREQ command into the CTLREG 106. Receipt of the MPUREQ indicates that the MPU 101 is ready for the FWDH 99 to begin the firmware download operation.

Figure 12A:
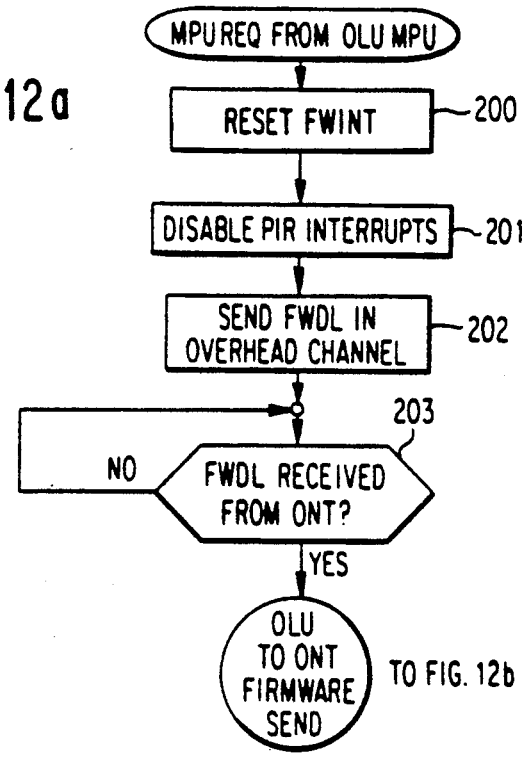
FIGS. 12a, 12b, 12c, 12d, and 12e illustrate the "MPUREQ from OLU MPU" state transition diagram for the FWDH.

Referring to block 200 in FIG. 12a, the FWINT latch 104 is reset so that, barring any subsequent setting of this latch, the MPU 101, during the next PIR Interrupt, will not mistakenly think that another firmware download request is being requested (FWINT latch 104 set). At block 201, the PIR enable latch 105 is reset so that further PIR interrupts, generated by the PIR Generator 102, will be disabled.

In block 202, the FWDL signal is transmitted via channel #28 (see FIG. 4) in order to notify the FWDH 99 on the ONT 20 that a firmware download operation is being requested. In decision block 203, the FWDL 109 signal is monitored to see if the FWDH 99 on the ONT 20 has acknowledged the request for a firmware download operation. If FWDL 109 is not active, the FWDH 99 stays in the state represented by block 203. When a FWDL signal is received from the other side, FWDL 109 becomes active and the FWDH 99 transitions to the state represented by block 204 on FIG. 12b.

Figure 12C:
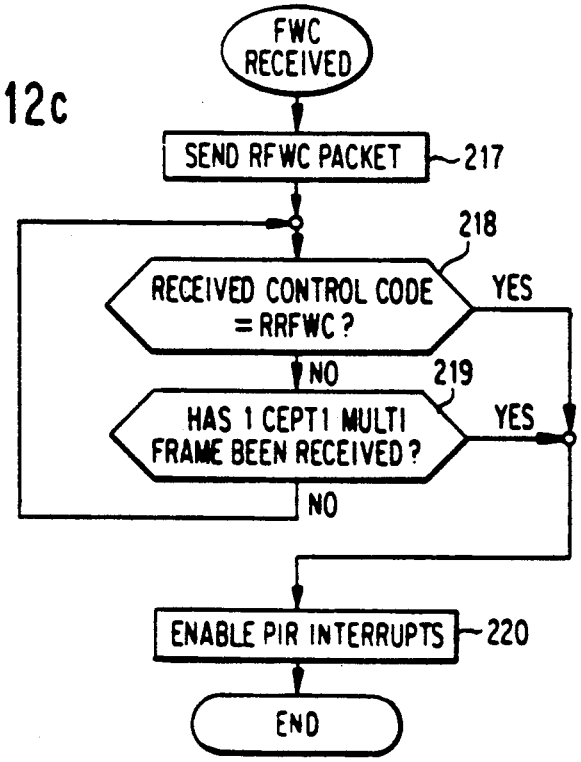
Figure 12B:
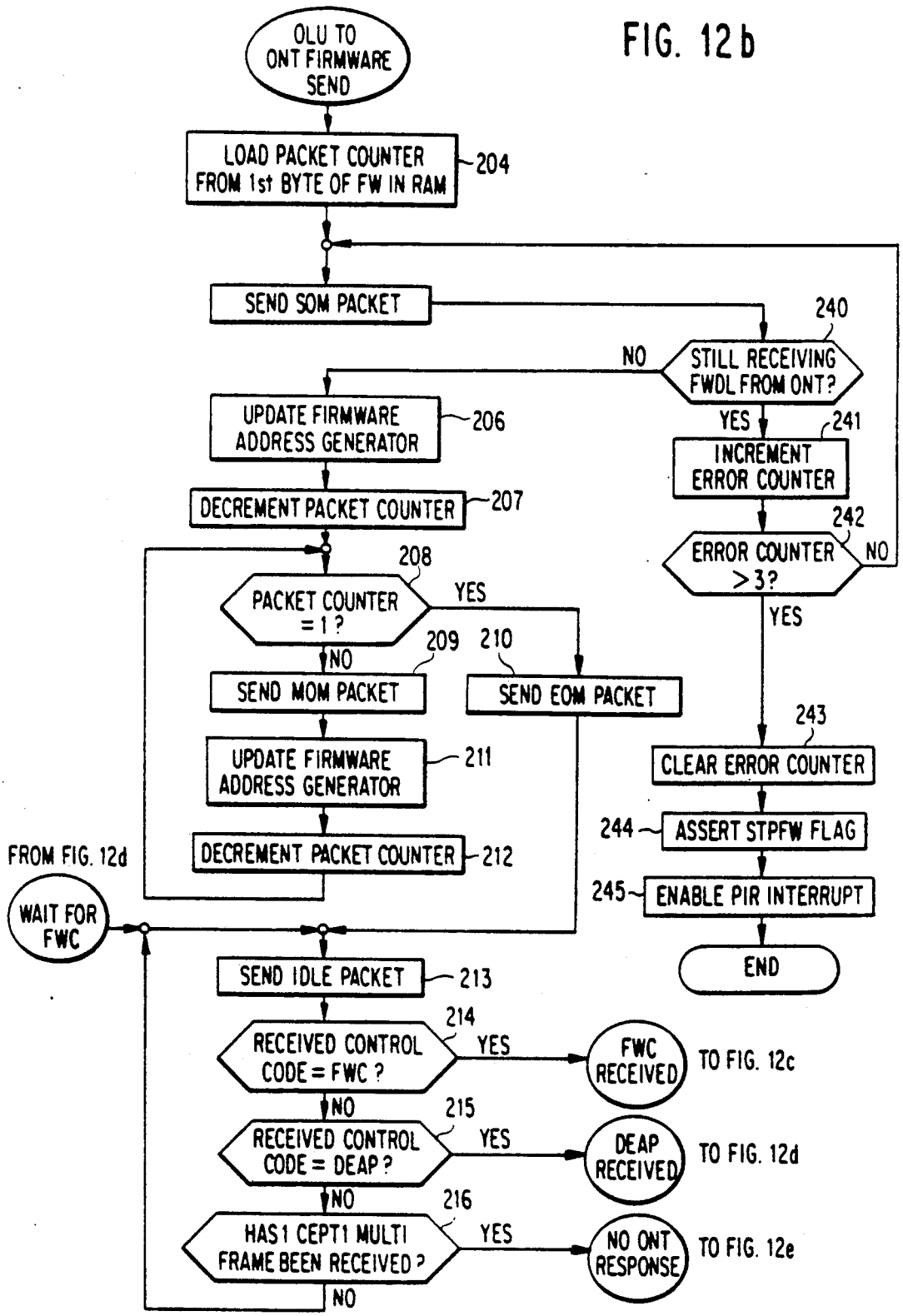

Block 204 on FIG. 12b shows that the FWDH 99 reads the first byte of the RAM 157 location where the firmware is stored, and loads this number into the packet counter 156. This number represents the total number of firmware data packets that must be transmitted to the ONT 20.

In block 205, the first firmware data packet is sent to the ONT 20. This first data packet always has its control byte set equal to SOM (see FIG. 7). Next, the FWDL signal 109 is monitored to see if the FWDH 99 on the ONT 20 is still sending it. Continued receipt of the FWDL signal 109 after the SOM packet has been sent indicates that the FWDH 99 on the ONT 20 did not recognize the SOM control byte. Consequently, if FWDL is still being received, the FWDH 99 on the OLU 17 transitions to the state represented by block 241, where the error counter 161 is incremented. In block 242, the error counter 161 is tested to see if more than 3 major errors have been counted. If not, the FWDH 99 on the OLU 17 will transition to the state represented by block 205, where another SOM packet will be sent to the FWDH 99 on the ONT 20 in an attempt to retry the firmware download operation. If, however, in block 242, the error counter 161 contains a number greater than 3, the FWDH 99 on the OLU 17 will abort the firmware download process altogether. This is accomplished by transitioning to the state represented by block 243. In block 243, the error counter 161 is cleared. Then, in block 244, the STPFW latch 103 is set so that the MPU 101 on the OLU 17 will know that too many errors were encountered to continue. Next, in block 245, the PIR enable latch 105 is set, so that the MPU 101 on the OLU 17 will, once again, take PIR interrupts.

Returning to the discussion of block 240, if the FWDH 99 on the OLU 17 is no longer receiving FWDL signals from the FWDH 99 on the ONT 20, then the FWDH 99 on the OLU 17 transitions to the state represented by block 206, where the firmware address generator 154 is updated so that it will point to the address of the next data packet. Then, in block 207, the packet counter 156 is decremented.

Referring to block 208 in FIG. 12b, the packet counter 156 is tested to see if it is equal to 1. If it is not, then at least 2 more data packets remain to be transmitted. Consequently, the FWDH 99 transitions into the state represented by block 209, where the next data packet is sent to the ONT 20. This data packet has its control byte set equal to MOM (see FIG. 7), in order to indicate that this is the middle of the message. Then in block 211 the firmware address generator 154 is updated so that it will point to the address of the next data packet, and in block 212 the packet counter 156 is decremented. The FWD then transitions back to the state represented by block 208.

When the test in block 208 finds that the packet counter 156 is equal to 1, this means that only one more packet remains to be transmitted. The FWDH 99 then transitions to the state represented by block 210, where the last data packet is sent to the ONT 20. This data packet has its control byte set equal to EOM (see FIG. 7), in order to indicate that this is the last firmware data packet in the message. The FWDH 99 then transitions to the state represented by block 213.

When the FWDH 99 is in the state represented by block 213, it has sent all of the firmware to the ONT 20, and is waiting for some kind of acknowledgement from the ONT 20. Therefore, in block 213 the FWDH 99 merely sends a data packet with the control byte set to IDLE (see FIG. 7). Then, in block 214, the FWDH 99 tests to see if a data packet with the control byte set equal to FWC (see FIG. 9) has been received from the ONT 20. If it has not, then in block 215 the FWDH 99 tests to see if a data packet with the control byte set equal to DEAP (see FIG. 9) has been received. If it has not, then in block 216 the FWDH 99 tests to see if 1 CEPT1 multiframe has yet been received. If not, the FWDH 99 will continue waiting for an acknowledgement from the ONT 20 by transitioning again to the state represented by block 213.

If, in block 214, an FWC frame had been received from the ONT 20, then the FWDH 99 would transition to the state represented by block 217, depicted in FIG. 12c.

Referring to FIG. 12c, when the FWDH is in the state represented by block 217, it has received an acknowledgement from the ONT 20 that all of the firmware was correctly received. The FWDH 99 acknowledges receipt of the ONT's 20 acknowledgement by sending, in block 217, a data packet with the control byte set to RFWC (see FIG. 7). Then, in block 218, the FWDH 99 waits for an acknowledgement indicating that the RFWC packet was received by the ONT 20. This is accomplished by examining incoming data frames and checking to see if their control bytes are set to RRFWC (see FIG. 9). If they are not, then the FWDH 99 transitions into the state represented by block 219, where it checks to see if 1 CEPT1 multiframe has yet been received. If not, then the FWDH 99 continues waiting for this acknowledgement by transitioning back to the state represented by block 218.

If, in block 218, an RRFWC frame had been received from the ONT 20, or, in block 219, 1 CEPT1 multiframe had been received, then the FWDH 99 discontinues its waiting by transitioning to the state represented by block 220. Note that in the preferred embodiment of the invention, the length of time to receive 1 CEPT1 multiframe is chosen as a timeout value. If no acknowledgement was received by then, then the FWDH 99 takes no special action, and instead, assumes that the acknowledgement was lost and that the ONT 20 has stopped the firmware download process.

In block 220, the FWDH 99 sets the PIR enable latch 105 so that the MPU 101 will take the next PIR interrupt generated by the PIR generator 102. Processing of the MPUREQ is then complete.

Figure 12D:
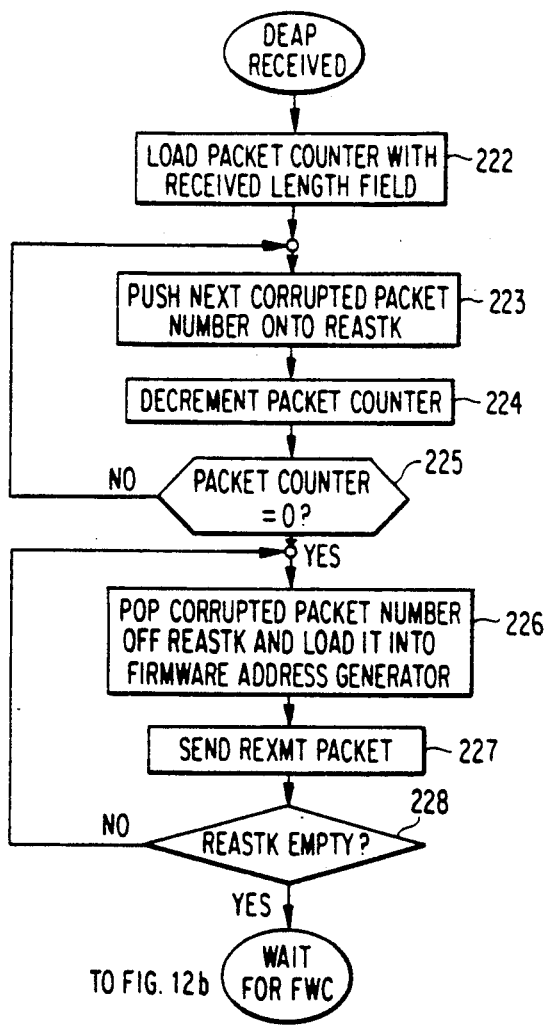

If, in block 215 in FIG. 12b, a DEAP frame had been received from the ONT 20, then the FWDH 99 would transition to the state represented by block 222, depicted in FIG. 12d. When the FWDH 99 is in this state, it must retransmit the packets whose addresses appear in the DEAP frame. This process begins in block 222 by loading the packet counter 156 with the length field received in the DEAP frame (see FIG. 8). The FWDH 99 then transitions to the state represented by block 223.

In block 223, the next corrupted packet number to appear in the DEAP bit stream appearing on the received PCM 137 line is pushed onto the REASTK 160. Next, in block 224, the packet counter 156 is decremented. The packet counter 156 is then tested, in block 225 to see if it is equal to zero. If it is not, then it means that more packet addresses will be appearing on the incoming DEAP bit stream appearing on the received PCM 137 line. Consequently, the FWDH 99 transitions back to the state represented by block 223 in order to continue this processing.

If, in block 225, the packet counter 156 is found to be equal to zero, then there are no more addresses that need to be pushed onto the REASTK 160, and the FWDH 99 transitions to the state represented by block 226.

The FWDH 99 is now ready to begin retransmitting the requested firmware data packets. In block 226, a corrupted packet number is popped off of the REASTK 160, and it is loaded into the firmware address generator 154. Then, in block 227, the 256 bytes of firmware pointed to by this address are sent to the ONT 20 in a data packet whose control byte is set equal to REXMT, in order to indicate that this data packet is being retransmitted. Next, in block 228, the REASTK EMPTY 114 flag is tested to see if any more firmware packets have to be retransmitted. If the REASTK 160 is not empty, then more data packets need to be sent. Consequently, the FWDH 99 transitions back to the state represented by block 226, where the retransmission process repeat for the next data packet.

If, in block 228, the REASTK EMPTY 114 flag is asserted, then there are no more firmware data packets that need to be retransmitted. At this point, the FWDH 99 needs to wait for the FWDH 99 on the ONT 20 to send some sort of acknowledgement to the OLU 17. This processing is identical to the processing that occurred after the initial transmission of the data. Consequently, the FWDH 99 transitions back to the state represented by block 213 on FIG. 12b.

Figure 12E:
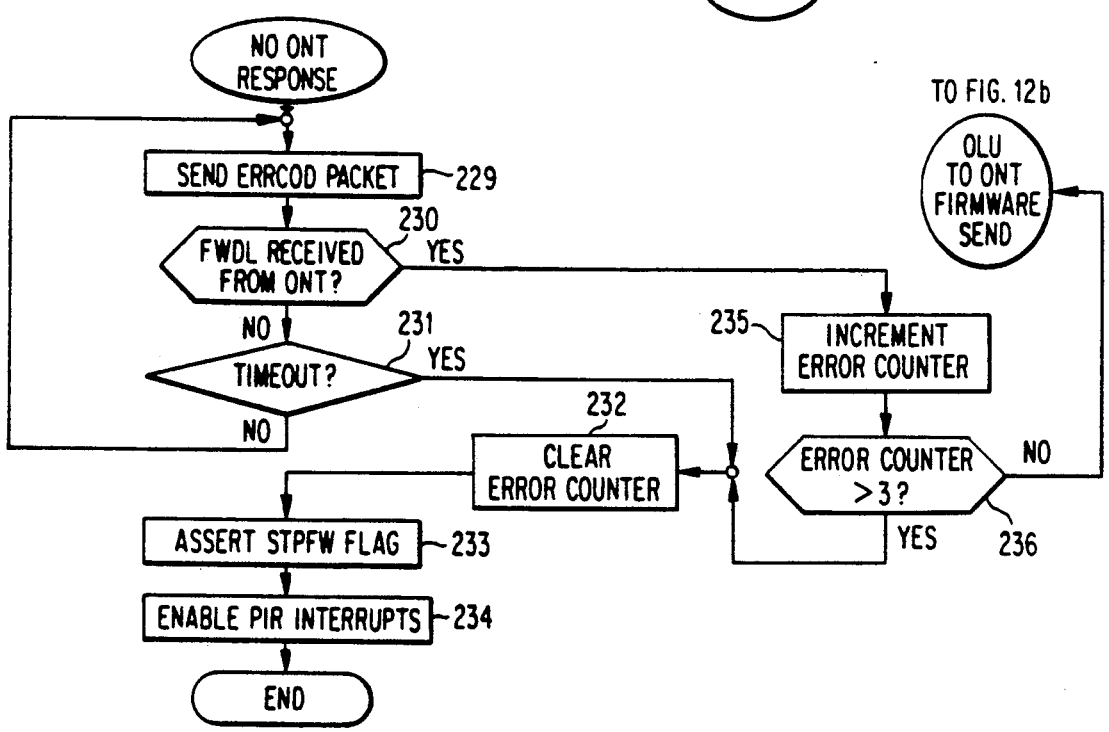

If, in block 216 in FIG. 12b, a CEPT1 multiframe had been received, then the FWDH 99 would transition to the state represented by block 229, depicted in FIG. 12e. In this state, the FWDH 99 has timed out while waiting for some sort of acknowledgement from the ONT 20. This is handled by reinitiating the firmware download procedure. Consequently, in block 229, the FWDH 99 sends a data packet with the control byte set equal to ERRCOD (see FIG. 7). When this packet is received by the FWDH 99 on the ONT 20 side, it should send an FWDL signal back to the OLU 17. Consequently, in block 230, the FWDH 99 on the OLU 17 looks to see if the FWDL signal 109 has been asserted by its overhead extract unit 155. If the FWDL signal 109 is not asserted, then the FWDH 99 transitions to the state represented by block 231, where it looks to se if it has waited a fair amount of time for this signal to arrive. If not, then the FWDH 99 transitions back to the state represented by block 229 where the entire process is repeated, beginning with the sending of the ERRCOD packet.

If, in block 230, the FWDH 99 finds the FWDL signal 109 asserted, then it will begin the entire process of transmitting the firmware to the ONT 20 all over again, as long as the total number of major errors does not exceed three. This is done by transitioning to the state represented by block 235 where the error counter 161 is incremented. Then, in block 236, the error counter 161 is tested to see if the count exceeds the value 3. If it does, then the FWDL 99 on the OLU 17 transitions to the state represented by block 232, where the FWDH clears the error counter 161. Next, in block 233, the FWDH 99 on the OLU 17 sets the STPFW latch 103, so that the next time it is checked by the MPU 101, the MPU 101 will know that future attempts at firmware downloading should be inhibited due to major errors. Then, in block 234, the FWDH 99 sets the PIR enable latch 105 so that the MPU 101 will take the next PIR interrupt generated by the PIR generator 102. Processing of the MPUREQ is then complete.

If, however, the test in block 236 showed that the error counter 161 did not contain a value greater than 3, the FWDH 99 on the OLU 17 transitions back to the state represented by block 204 on FIG. 12b, where the firmware download process will start again.

Referring, still, to FIG. 12e, if in block 231 the FWDH 99 finds that it has waited a fair amount of time without receiving the FWDL signal 109 from the ONT 20, then a timeout occurs, and the FWDH 99 transitions to the state represented by block 232. In block 232, the FWDH 99 on the OLU 17 clears the error counter 161. Then, in block 233, it sets the STPFW latch 103, so that the next time it is checked by the MPU 101, the MPU 101 will know that future attempts at firmware downloading should be inhibited due to major errors. Then, in block 234, the FWDH 99 sets the PIR enable latch 105 so that the MPU 101 will take the next PIR interrupt generated by the PIR generator 102. Processing of the MPUREQ is then complete.

2) "Periodic Interrupt of OLU/ONT MPU" (FIG. 13)

The "Periodic Interrupt of OLU/ONT MPU" routine, depicted in FIG. 13, shows the processing performed by the MPU 101 when it takes a PIR interrupt which has been generated by the PIR generator 102. Only the processing which is relevant to the firmware download operation of the present invention is depicted. This processing is not changed by the MPU 101 being located on an OLU 17, or on an ONT 20. Consequently, only one routine is shown for the both of them.

When the MPU 101 receives a PIR interrupt, it needs to find out whether it needs to respond to an FWDH 99 communication. Consequently, in block 300 of FIG. 13, the MPU 101 checks the STPFW latch 103 to see if it is set. Setting this latch is the FWDH's 99 way of telling the MPU 101 that too many errors occurred during the last attempted firmware download operation, and that future attempts should be inhibited. Although this signal is available whether the MPU 101 is located on an OLU 17 or an ONT 20, in the preferred embodiment of the invention its use is restricted to the OLU 17 side. If the STPFW latch 103 is set, the MPU 101 continues processing at block 301, where the MPU 101 writes the DSBLFW command into CTLREG 106. This command tells the FWDH 99 to ignore incoming FWDL signals 109 that may be sent from the other side. The MPU 101 continues its processing at block 305, where the STPFW latch 103 is reset. Because the rest of the processing is up to the FWDH 99, the MPU 101 is done with its processing.

If, in block 300, the STPFW latch 103 was not set, then the MPU 101 continues its processing at block 302, where it checks the FWINT latch 104 to see if it is set. If it is set, then this means that the FWDH 99 has received a request from the other side for a firmware download operation to begin. As a result, the MPU 101 processing continues at block 303, where the MPU 101 writes the MPUREQ command into CTLREG 106. This command tells the FWDH 99 to begin the firmware download process. Because the rest of the processing is up to the FWDH 99, the MPU 101 is done with its processing.

If, in block 302, the STPFW latch 103 was not set, then the MPU 101 continues its processing at block 304, where it writes the NRMLOP command into CTLREG 106. This command tells the FWDH 99 that it should respond to any requests from the other side for a firmware download operation to begin. The MPU 101 is then done with its processing.

3) "OLU/ONT MPU Reset" (FIG. 14)

The "OLU/ONT MPU Reset" routine, depicted in FIG. 14, shows the processing that would be performed by an MPU 101, whether on an OLU 17 or an ONT 20, whenever a reset command was issued. After a reset, normal subscriber communications have been cut off, and it is likely that a firmware download operation will have to be performed. It is the MPU's 101 job to initiate this.

Consequently, in block 400 of FIG. 14, the MPU 101 first goes through a system integrity test to make sure that the unit (OLU 17 or ONT 20) is operating correctly. The MPU 101 then continues its processing at block 401, where it looks at the results of the system integrity test. If errors were found, processing continues at block 402, where appropriate measures would be taken in response to the discovered problems.

If, in block 401, the system is found to be operating normally, processing will continue at block 403, where the MPU 101 will write the MPUREQ command into the CTLREG 106. This command tells the FWDH 99 to begin the firmware download process. Because the rest of the processing is up to the FWDH 99, the MPU 101 is done with its processing.

4) "NRMLOP Received from OLU/ONT MPU" (FIG. 15)

The "NRMLOP Received from OLU/ONT MPU" state transition diagram (FIG. 15) shows the operation of the FWDH 99 after the MPU 99 writes a NRMLOP command into CTLREG 106. The response of the FWDH 99 to the NRMLOP command is the same whether the FWDH 99 is installed in an OLU 17, or an ONT 20. The purpose of the NRMLOP command is to allow the FWDH 99 to accept incoming firmware download requests (FWDL) from the other side.

Consequently, in block 500 of FIG. 15, the FWDH 99 initializes all counters (such as packet counter 156, and the initial value for the firmware address generator 154) that will be necessary to start a firmware download operation. The FWDH 99 then transitions to the state represented by block 501.

At block 501, the FWDH 99 checks to see if the FWDL signal 109 is being asserted. If this signal is not asserted, then no firmware download request has been received from the other side, and the FWDH 99 must continue waiting. Therefore, it remains in the state represented by block 501.

If the FWDL signal 109 is asserted, then the FWDH 99 transitions to the state represented by block 502, where it sets the FWINT latch 104. The FWDH 99 is then finished with this routine.

The setting of the FWINT latch 104 will be detected by the MPU 101 during the next occurrence of the PIR interrupt, and the MPU 101 will be able to start the firmware download operation by writing MPUREQ into CTLREG 106.

5) "DSBLFW Received from OLU/ONT MPU" (FIG. 16)

The "DSBLFW Received from OLU/ONT MPU" state transition diagram shown in FIG. 16 shows the operation of the FWDH 99 after the MPU 101 has written DSBLFW into the CTLREG 106. Operation of the FWDH 99 in this instance is the same whether the FWDH 99 is installed in an OLU 17 or in an ONT 20. The purpose of the DSBLFW command is to inhibit the FWDH 99 from responding to any firmware download requests (FWDL) from the other side. Although this command may be issued in either the OLU 17 or ONT 20, it is primarily useful in the OLU 17 after the MPU 101 has found the STPFW latch 103 set by the FWDH 99 as an indication that too many errors occurred during the last attempted firmware download operation for another one to be tried.

The FWDH 99 first enters a state represented by block 600 in FIG. 16, where it resets the STPFW latch 103, so that it will be initialized for any future firmware download operations that may be attempted. Next, the FWDH 99 enters a state, represented by block 601, where it does nothing but remain in that state. Note that the FWDH 99 would change states if the MPU 101 were to write either an MPUREQ or a NRMLOP command into CTLREG 106.

6) "MPUREQ from ONT MPU" (FIGS. 17a, 17b, 17c, 17d, 17e)

The "MPUREQ from ONT MPU" state transition diagram (FIGS. 17a, 17b, 17c, 17d, and 17e) illustrates the operation of an FWDH 99 which is located on an ONT 20, after the MPU 101 has written an MPUREQ command into the CTLREG 106. Receipt of the MPUREQ indicates that the MPU 101 is ready for the FWDH 99 to begin the firmware download operation.

Figure 17A:
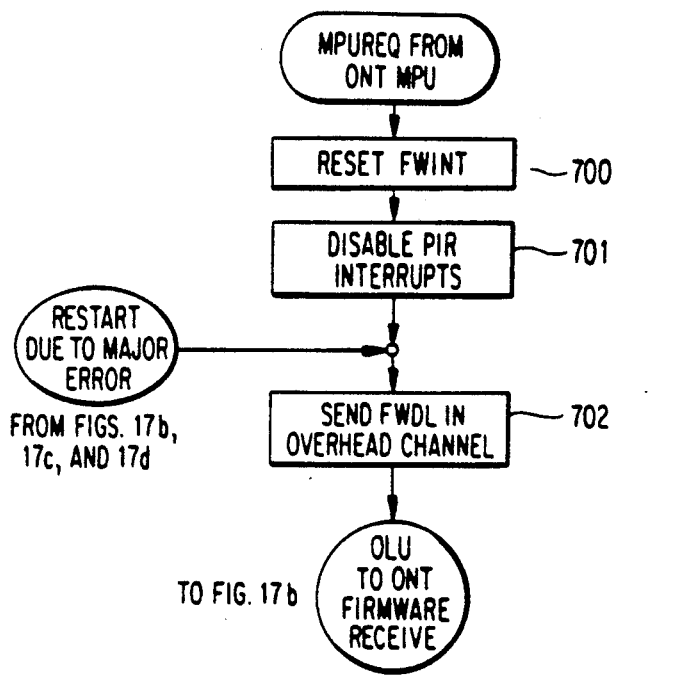
FIGS. 17a, 17b, 17c, 17d, and 17e illustrate the "MPUREQ from ONT MPU" state transition diagram for the FWDH.

Referring to block 700 in FIG. 17a, the FWINT latch 104 is reset so that, barring any subsequent setting of the latch, the MPU 101, during the next PIR Interrupt, will not mistakenly think that another firmware download request is being requested (FWINT latch 104 set). At block 701, the PIR enable latch 105 is reset so that further PIR interrupts, generated by the PIR Generator 102, will be disabled.

In block 702, the FWDL signal is transmitted via channel #28 (see FIG. 4) in order to notify the FWDH 99 on the OLU 17 that a firmware download operation is being requested. The FWDH 99 on the ONT 20 then transitions to the state represented by block 705 in FIG. 17b.

Figure 17E:
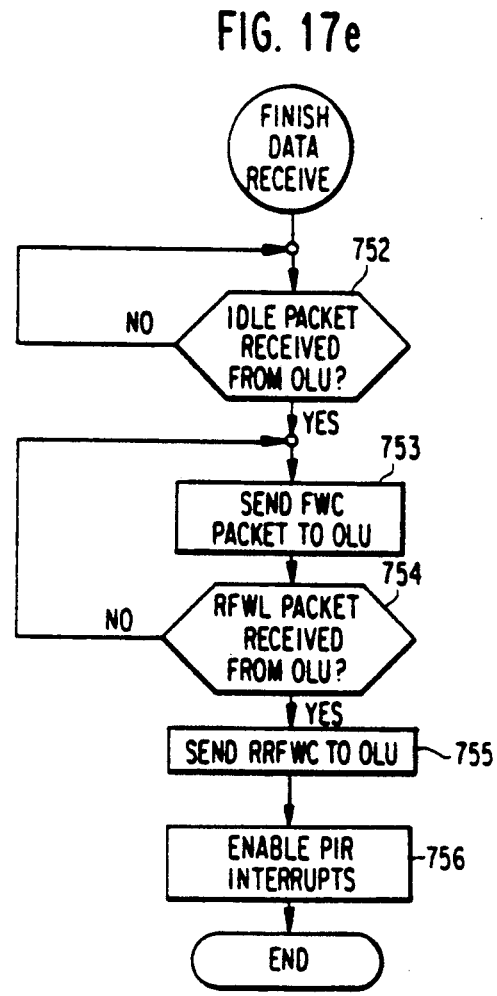
Figure 17B:
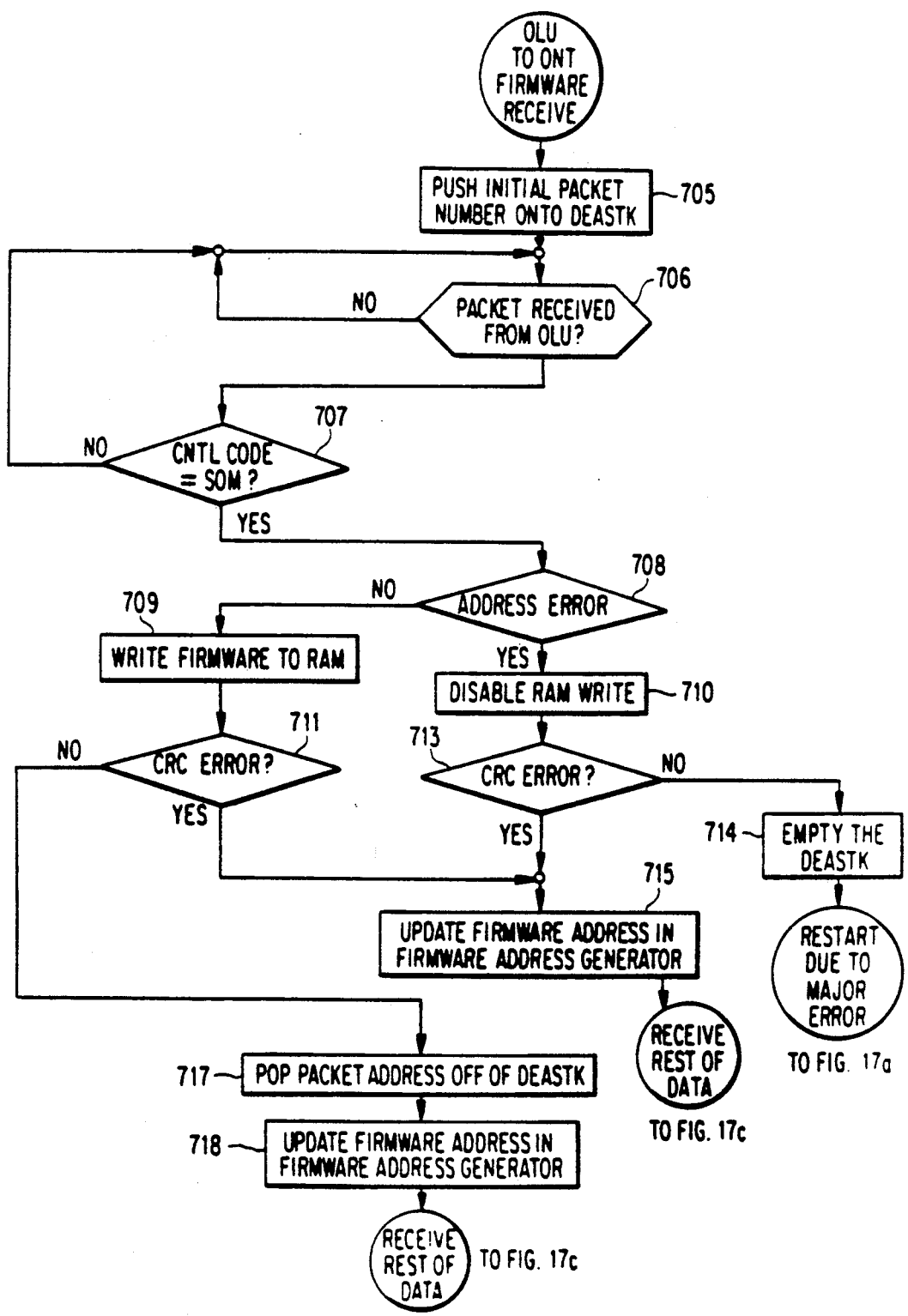

Referring to FIG. 17b, block 705 shows that the FWDH 99 loads the initial packet number onto the DEASTK 158. This value is obtained from the firmware address generator 154.

The FWDH 99 then transitions to the state represented by block 706, where it looks to see if a data packet has been received from the OLU 17. If it has not, then the FWDH 99 stays in this state.

If the processing in block 706 detects that a data packet has arrived from the OLU 17, then the FWDH 99 transitions to the state represented by block 707, where the Control byte is checked to see if it is equal to SOM (see FIG. 7). This is the expected value, because the FWDH 99 should be receiving the first data packet of the transmission. Therefore, if the Control byte in block 708 is not equal to SOM, the FWDH 99 transitions back to the state represented by block 706 where it will wait for the next data packet to arrive. The assumption is that the current non-SOM data packet may be left over from a prior unsuccessful attempt at firmware download, or it may just be noise on the line before any data transmission has been started. Therefore, the FWDH 99 will wait for the OLU 17 to send a data packet which is clearly the beginning of the firmware download transmission.

If the Control byte in block 707 is equal to SOM, then this is the expected first data packet, and the FWDH 99 transitions to the state represented by block 708. In block 708, the FWDH 99 checks to see whether the Address Error signal 111 has been asserted by the address extract & compare hardware 151. If it has, then this is definitely an error, but it must still be determined whether it is a major or minor error. Consequently, the FWDH 99 transitions to the state represented by block 710, where the RAM Ctl signal 127 makes sure that no actual writing of RAM 157 occurs. This is to ensure the integrity of the data already stored in the RAM 157.

Next, in block 713, the CRCERR signal 110 is examined to se if it has been asserted by the CRC16 compare & generator hardware 150. If CRCERR 110 has not been asserted, then the previously detected address error must be due to the fact that the FWDH 99 on the ONT 20 is out of synchronization with the sending FWDH 99 on the OLU 19. This is a major error. Consequently, the FWDH 99 on the ONT 20 will transition to the state represented by block 714, where the DEASTK 158 is emptied. Next, the FWDH 99 transitions to the state represented by block 702 on FIG. 17a, so that the entire firmware download operation will be restarted.

Returning to FIG. 17b, if CRCERR 110 was found to be asserted in block 713, then the previously detected address error is probably due to the corruption of data bits during the transmission of the packet. This is a minor error. Consequently, the packet address that was previously pushed onto the DEASTK 158 is allowed to remain there, and the FWDH 99 transitions to the state represented by block 715.

In block 715, the FWDH 99 updates the firmware address that is stored in the firmware address generator 154. This is in order to get ready for the next received data packet. Then, the FWDH 99 transitions to the state represented by block 720 on FIG. 17c, so that the remaining firmware data packets may be received.

Returning to the discussion of block 708 on FIG. 17b, if no address error occurred (Address Error signal 111 not asserted), then#, at most, only a minor error occurred, and the FWDH 99 transitions to the state represented by block 709 where the received packet of firmware is written to RAM 157. Next, in block 711, the FWDH 99 continues checking the received packet for errors. This is accomplished by examining the CRCERR signal 110 to see if it has been asserted by the CRC16 compare & generator hardware 150. If it has been asserted, then the received firmware data packet contained bits which were corrupted during the transmission. This is a minor error, so the packet address pushed onto the DEASTK 158 is allowed to remain there. The FWDH 99 next transitions to the state represented by block 715, where it updates the firmware address that is stored in the firmware address generator 154. This is in order to get ready for the next received data packet. Then, the FWDH 99 transitions to the state represented by block 720 on FIG. 17c, so that the remaining firmware data packets may be received.

Returning to FIG. 17b, if CRCERR 110 was not found to be asserted in block 711, then the received firmware data packet has been received intact, and the FWDH 99 transitions to the state represented by block 717, where it pops the packet address off of the DEASTK 158. This is done because this data packet was received intact, so there is no need to request that it be retransmitted later. Next, in block 718, the packet address stored in the firmware address generator 154 is updated so that it will be ready for the next received data packet. The FWDH 99 then transitions to the state represented by block 720 on FIG. 17c, in order to receive the rest of the firmware data packets.

Figure 17C:
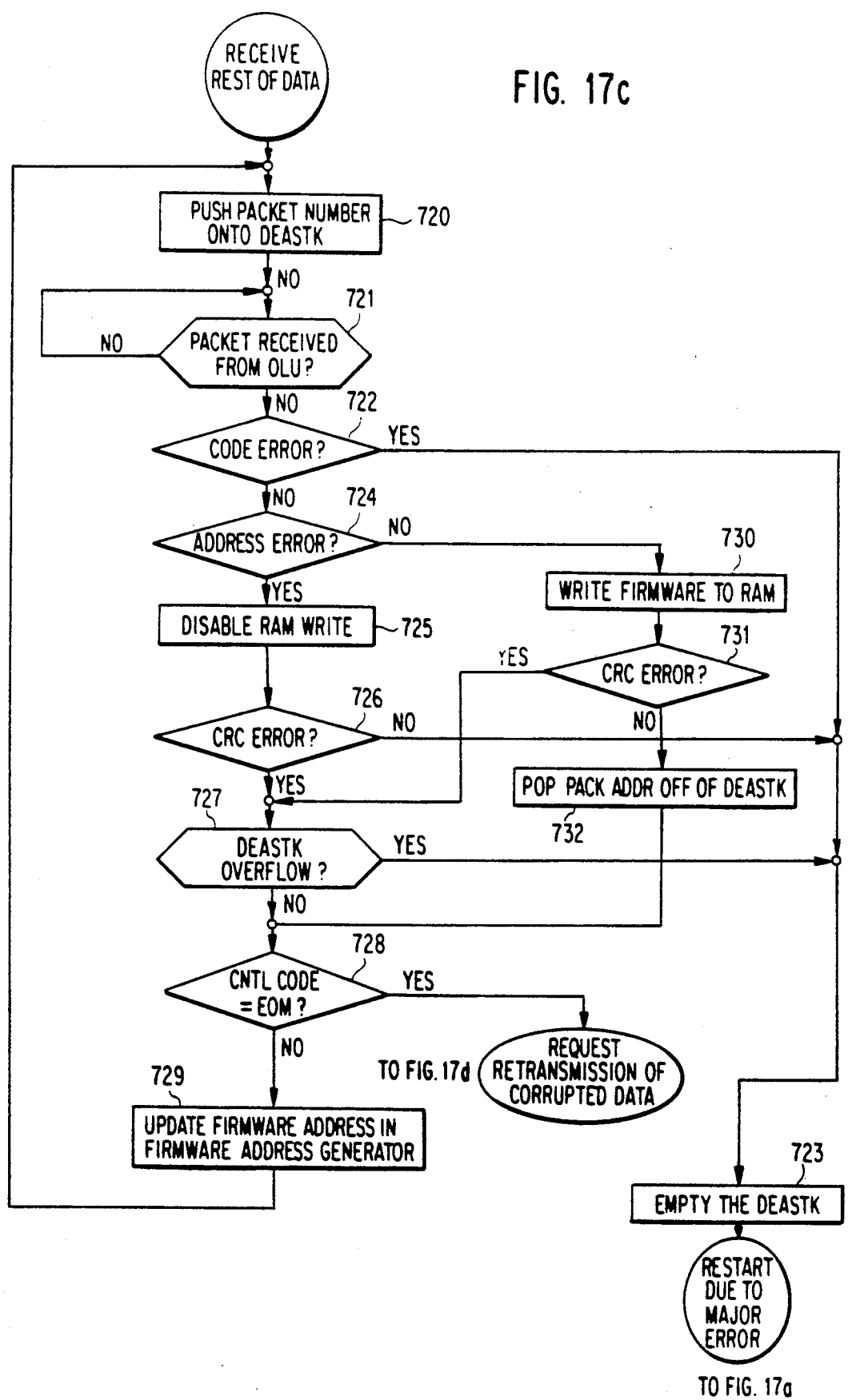

When the FWDH 99 first enters the state represented by block 720 on FIG. 17c, it has already received the first data packet of the transmission. Consequently, the remaining received data packets are expected to have their Control bytes set equal to MOM (see FIG. 7), except for the very last data packet, which will have its Control byte set equal to EOM (see FIG. 7). Despite these differences, the operation of the FWDH 99 for receiving these remaining data packets is very similar, although not identical, to the operation of receiving the SOM data packet.

Block 720 in FIG. 17c shows that the FWDH 99 pushes the next packet number onto the DEASTK 158. This value is obtained from the firmware address generator 154.

Next, the FWDH 99 transitions to the state represented by block 721, where the FWDH 99 looks to see if a data packet has been received from the OLU 17. If it has not, then the FWDH 99 stays in this state.

If the processing in block 721 detects that a data packet has arrived from the OLU 17, then the FWDH 99 transitions to the state represented by block 722, in order to see whether the CNTRL Code Error signal 116 is asserted. This signal is generated by the Code Extract hardware 152, and indicates that the value of the received CNTRL byte is not valid. If CNTRL Code Error 116 is asserted, this is a major error, and the FWDH 99 will transition to the state represented by block 723. In block 723, the FWDH 99 empties its DEASTK 158, and transitions to the state represented by block 702 in FIG. 17a, so that the entire firmware download operation will be restarted.

Returning to block 722 on FIG. 17c, if CNTRL Code Error 116 is not asserted, then the FWDH 99 transitions to the state represented by block 724, where the FWDH 99 checks to see whether the Address Error signal 111 has been asserted by the address extract & compare hardware 151. If it has, then this is definitely an error, but it must still be determined whether it is a major or minor error. Consequently, the FWDH 99 transitions to the state represented by block 725, where the RAM Ctl signal 127 makes sure that no actual writing of RAM 157 occurs. This is to ensure the integrity of the data already stored in the RAM 157. Next, in block 726, the CRCERR signal 110 is examined to see if it has been asserted by the CRC16 compare & generator hardware 150. If CRCERR 110 has not been asserted, then the previously detected address error must be due to the fact that the FWDH 99 on the ONT 20 is out of synchronization with the sending FWDH 99 on the OLU 19. This is a major error. Consequently, the FWDH 99 on the ONT 20 will transition to the state represented by block 723, where the DEASTK 158 is emptied. Next, the FWDH 99 transitions to the state represented by block 702 on FIG. 17a, so that the entire firmware download operation will be restarted.

Returning to FIG. 17c, if CRCERR 110 was found to be asserted in block 726, then the previously detected address error is probably due to the corruption of data bits during the transmission of the packet. This is a minor error. Consequently, the packet address that was previously pushed onto the DEASTK 158 is allowed to remain there, and the FWDH 99 transitions to the state represented by block 727.

In block 727, the DEASTK OVFLW 113 signal is examined to see if the last push operation caused the DEASTK to overflow. If it did, it means that the ONT 20 has received too many corrupted data packets to keep track of. As a result, the FWDH 99 transitions to the state represented by block 723, where it proceeds to empty the DEASTK 158. Next, the FWDH 20 transitions to the state represented by block 702 on FIG. 17a, so that the entire firmware download process may be reinitiated.

Returning to the discussion of block 727 on FIG. 17c, if the DEASTK OVFLW 113 signal is not asserted, then the FWDH 99 continues processing by transitioning to the state represented by block 728.

In block 728, the Control byte of the received packet is checked to see if it is equal to the value EOM (see FIG. 7). If it is then this was the last firmware data packet transmitted to the ONT 20 by the OLU 17, and the FWDH 99 transitions to the state represented by block 735 on FIG. 17d, so that any data packets which were received with corrupted bits may be requested for retransmission.

If the Control byte in block 728 of FIG. 17c is not equal to the value EOM, then there is at least one more data packet that should be received. Consequently, in block 729, the FWDH 99 updates the firmware address that is stored in the firmware address generator 154. This is in order to get ready for the next received data packet. Then, the FWDH 99 transitions back to the state represented by block 720, so that the remaining firmware data packets may be received.

Returning to the discussion of block 724, if no address error occurred (Address Error signal 111 not asserted), then the FWDH 99 transitions to the state represented by block 730, where it writes the received firmware packet into RAM 157. Then the FWDH 99 continues checking the received packet for errors by transitioning to the block represented by block 731. In block 731, the CRCERR signal 110 is examined to see if it has been asserted by the CRC16 compare & generator hardware 150. If it has been asserted, then the received firmware data packet contained bits which were corrupted during the transmission. This is a minor error, so the packet address that was previously pushed onto the DEASTK 158 is allowed to remain there. Next, the FWDH 99 transitions to the state represented by block 727.

In block 727, the DEASTK OVFLW 113 signal is examined to see if the last push operation caused the DEASTK to overflow. If it did, it means that the ONT 20 has received too many corrupted data packets to keep track of. As a result, the FWDH 99 transitions to the state represented by block 723, where it proceeds to empty the DEASTK 158. Next, the FWDH 20 transitions to the state represented by block 702 on FIG. 17a, so that the entire firmware download process may be reinitiated.

Returning to the discussion of block 727 on FIG. 17c, if the DEASTK OVFLW 113 signal is not asserted, then the FWDH 99 continues processing by transitioning to the state represented by block 728.

In block 728, the Control byte of the received packet is checked to see if it is equal to the value EOM (see FIG. 7). If it is then this was the last firmware data packet transmitted to the ONT 20 by the OLU 17, and the FWDH 99 transitions to the state represented by block 735 on FIG. 17d, so that any data packets which were received with corrupted bits may be requested for retransmission.

If the Control byte in block 728 of FIG. 17c is not equal to the value EOM, then there is at least one more data packet that should be received. Consequently, in block 729, the FWDH 99 updates the firmware address that is stored in the firmware address generator 154. This is in order to get ready for the next received data packet. Then, the FWDH 99 transitions back to the state represented by block 720, so that the process may be repeated in order to receive the remaining firmware data packets.

Returning to block 731, if CRCERR 110 was not found to be asserted, then the received firmware data packet has been received intact and the FWDH 99 transitions to the state represented by block 732, where the FWDH 99 pops the packet address off of the DEASTK 158. This is done because this data packet was received intact, so there is no need to request that it be retransmitted later. The FWDH 99 then transitions to the state represented by block 728. Note that there is no need to check to see if the DEASTK 158 had an overflow in the previous push operation, since that data has now been popped off of the DEASTK 158.

In block 728, the Control byte of the received packet is checked to see if it is equal to the value EOM (see FIG. 7). If it is then this was the last firmware data packet transmitted to the ONT 20 by the OLU 17, and the FWDH 99 transitions to the state represented by block 735 on FIG. 17d, so that any data packets which were received with corrupted bits may be requested for retransmission.

If the Control byte in block 728 of FIG. 17c is not equal to the value EOM, then there is at least one more data packet that should be received. Consequently, in block 729, the FWDH 99 updates the firmware address that is stored in the firmware address generator 154. This is in order to get ready for the next received data packet. Then, the FWDH 99 transitions back to the state represented by block 720, so that the process may be repeated in order to receive the remaining firmware data packets.

Figure 17D:
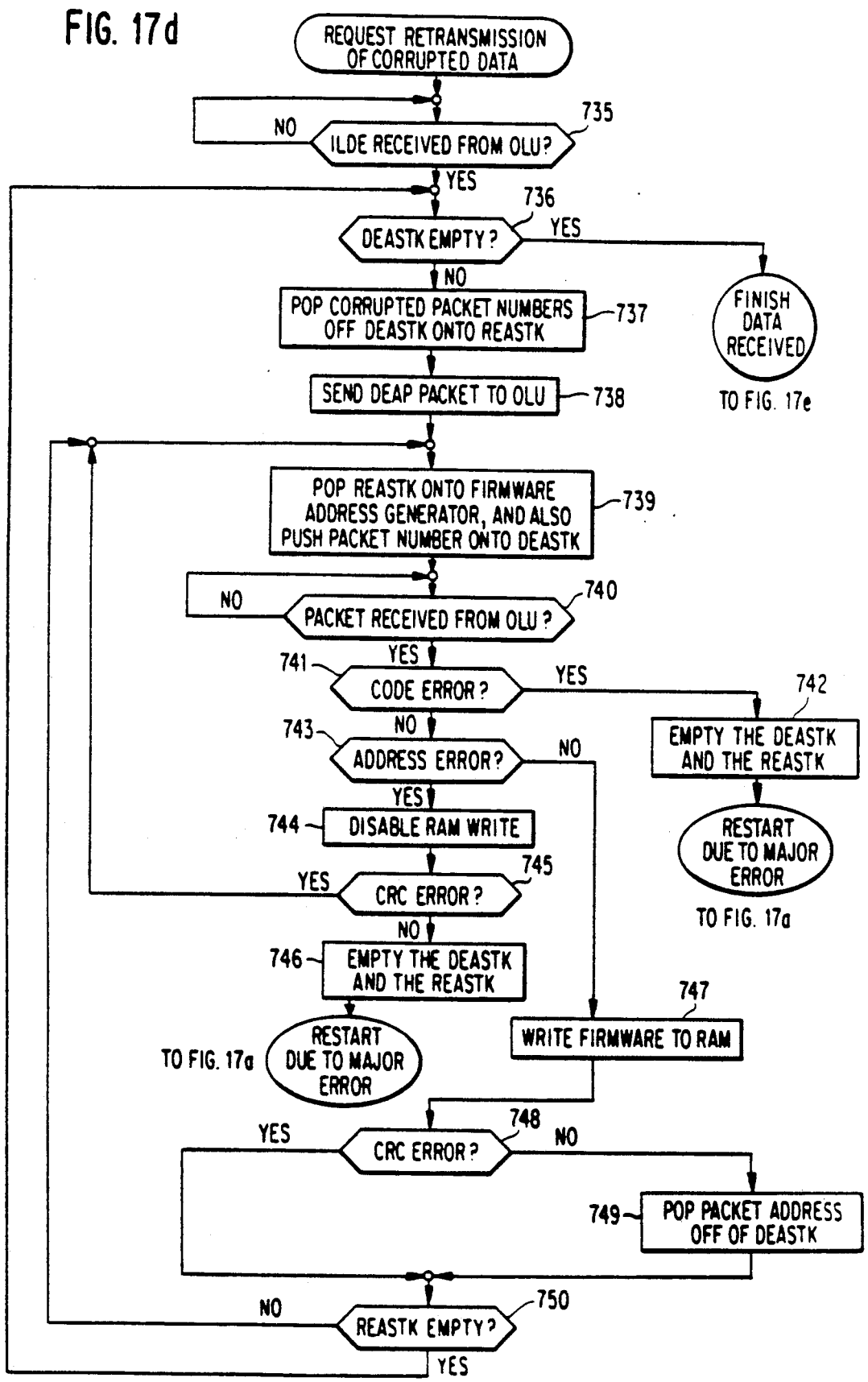

When the FWDH 99 is in the state represented by block 735 in FIG. 17d, it has finished receiving all of the packets transmitted by the OLU 17, and is ready to send an acknowledgement to the OLU 17. The form of this acknowledgement depends on whether any of the received data packets contained corrupted data. If not, then the ONT 20 can tell the OLU 17 that all of the data was satisfactorily received. Otherwise, the ONT 20 must request that the corrupted data packets be retransmitted.

More specifically, when the FWDH 99 on the ONT 20 is in the state represented by block 735 on FIG. 17d, it monitors the Received PCM 137 line until a data packet is received whose Control byte is set equal to the value IDLE (see FIG. 7). As long as this data packet has not been received, the FWDH 20 remains in the state represented by block 735.

When the IDLE data packet is received, the FWDH 99 transitions into the state represented by block 736. At block 736, the DEASTK Empty signal 112 is checked, to see if the DEASTK 158 is empty. If it is empty, then all of the data packets were received without error, and the FWDH 99 transitions to the state represented by block 752 on FIG. 17e, in order to complete the handshaking process with the OLU 17.

If the DEASTK 158 is not empty, then the FWDH 99 transitions to the state represented by block 737 on FIG. 17d, in order to request certain data packets to be retransmitted. At block 737, the packet numbers of those data packets which were received with corrupted bits are popped off of the DEASTK 158, and onto the REASTK 160. The REASTK 160 stores the packet addresses in the order in which they should be arriving. Then, at block 738, these packet numbers from the DEASTK 158 are sent on the PCM Out line 133 back to the OLU 17, in a data frame whose control byte is set equal to DEAP (see FIGS. 8 and 9). The FWDH 99 then transitions to the state represented by block 739.

Block 739 in FIG. 17d shows that the FWDH 99 pops a packet address off of the REASTK 160, loads it into the firmware address generator 154, and also pushes it onto the DEASTK 158. This is done in anticipation of this particular packet being retransmitted by the OLU 17.

Next, the FWDH 99 continues processing by transitioning to the state represented by block 740.

In block 740, the FWDH 99 looks to see if a data packet has been received from the OLU 17. If it has not, then the FWDH 99 stays in this state.

If the processing in block 740 detects that a data packet has arrived from the OLU 17, then the FWDH 99 transitions to the state represented by block 741, in order to see whether the CNTRL Code Error signal 116 is asserted. This signal is generated by the Code Extract hardware 152, and indicates that the value of the received Control byte is not valid. If CNTRL Code Error 116 is asserted, this is a major error, and the FWDH 99 will transition to the state represented by block 742. In block 742, the FWDH 99 empties both the DEASTK 158 and the REASTK 160, and transitions to the state represented by block 702 in FIG. 17a, so that the entire firmware download operation will be restarted.

Returning to block 741 on FIG. 17d, if CNTRL Code Error 116 is not asserted, then the FWDH 99 transitions to the state represented by block 743, where the FWDH 99 checks to see whether the Address Error signal 111 has been asserted by the address extract & compare hardware 151. If it has, then this is definitely an error but it must still be determined whether it is a major or minor error. Consequently, the FWDH 99 transitions to the state represented by block 744, where the RAM Ctl signal 127 makes sure that no actual writing of RAM 157 occurs. This is to ensure the integrity of the data already stored in the RAM 157. Next, in block 745, the CRCERR signal 110 is examined to see if it has been asserted by the CRC16 compare & generator hardware 150. If CRCERR 110 has not been asserted, then the previously detected address error must be due to the fact that the FWDH 99 on the ONT 20 is out of synchronization with the sending FWDH 99 on the OLU 19. This is a major error. Consequently, the FWDH 99 on the ONT 20 will transition to the state represented by block 746, where both the DEASTK 158 and the REASTK 160 are emptied. Next, the FWDH 99 transitions to the state represented by block 702 on FIG. 17a, so that the entire firmware download operation will be restarted.

Returning to FIG. 17d, if CRCERR 110 was found to be asserted in block 745, then the previously detected address error is probably due to the corruption of data bits during the transmission of the packet. This is a minor error. Consequently, the packet address that was previously pushed onto the DEASTK 158 is allowed to remain there, and the FWDH 99 transitions back to the state represented by block 739, so that the remaining retransmitted firmware data packets may be received.

Returning to the discussion of block 743, if no address error occurred (Address Error signal 111 not asserted), then the FWDH 99 transitions to the state represented by block 747, where it writes the received firmware packet into the RAM 157. The FWDH 99 then continues checking the received packet for errors by transitioning to the block represented by block 748. In block 748, the CRCERR signal 110 is examined to see if it has been asserted by the CRC16 compare & generator hardware 150. If it has been asserted, then the received firmware data packet contained bits which were corrupted during the transmission. This is a minor error. Next, the FWDH 99 transitions to the state represented by block 750.

In block 750, the REASTK Empty signal 114 is checked to see if the REASTK 160 is empty. If it is, then this was the last firmware data packet that was retransmitted to the ONT 20 by the OLU 17, and the FWDH 99 transitions back to the state represented by block 736 so that any data packets which were again received with corrupted bits may be requested for retransmission.

If the REASTK 160 was not found to be empty in block 750, then there is at least one more retransmitted data packet that should be received. Consequently, the FWDH 99 transitions back to the state represented by block 739, so that the process may be repeated in order to receive the remaining retransmitted firmware data packets.

Returning to block 748, if CRCERR 110 was not found to be asserted, then the received firmware data packet has been received intact, and the FWDH 99 transitions to the state represented by block 749, where the FWDH 99 pops the packet address off of the DEASTK 158. This is done because this data packet was received intact, so there is no need to request that it be retransmitted later. The FWDH 99 then transitions to the state represented by block 750.

In block 750, the REASTK Empty signal 114 is checked to see if the REASTK 160 is empty. If it is, then this was the last firmware data packet that was retransmitted to the ONT 20 by the OLU 17, and the FWDH 99 transitions back to the state represented by block 736 so that any data packets which were again received with corrupted bits may be requested for retransmission.

If the REASTK 160 was not found to be empty in block 750, then there is at least one more retransmitted data packet that should be received. Consequently, the FWDH 99 transitions back to the state represented by block 739, so that the process may be repeated in order to receive the remaining retransmitted firmware data packets.

When the FWDH 99 is in the state represented by block 752 in FIG. 17e, all of the firmware has been received without errors. All that remains is for the FWDH 99 on the ONT 20 to inform the FWDH 99 on the OLU 17 that no more data packets have to be retransmitted.

The FWDH 99 begins this process, at block 752, by waiting for a data packet to be received from the OLU 17, whose Control byte is set equal to the value IDLE (see FIG. 7). Until this occurs, the FWDH 99 remains in this state.

When an IDLE packet has been received, the FWDH 99 transitions to the state represented by block 753, where it sends a data frame to the OLU 17 with the Control byte set equal to the value FWC (see FIG. 9). Receipt of a FWC frame informs the OLU 17 that all of the firmware has been received by the ONT 20 without error.

Next, the FWDH 99 on the ONT 20 transitions to the state represented by block 754, where the FWDH 99 monitors the Received PCM line 137, waiting for a data packet to arrive with the control byte set equal to the value RFWC (see FIG. 7). Receipt of the RFWC informs the ONT 20 that the OLU 1 has received the previous FWC data frame from the ONT 20. If the RFWC packet is not received, the FWDH 99 transitions back to the state represented by block 753. In this fashion, the ONT 20 will continue sending FWC data frames to the OLU 17 until the OLU 17 responds with the RFWC data packet.

When the FWDH 99 detects, in block 754, that the RFWC packet has been received, it transitions to the state represented by block 755. In block 755, the FWDH 99 sends a data frame to the OLU 17 with the Control byte set equal to RRFWC (see FIG. 9). When the OLU 17 receives this data frame, it knows that the ONT 20 has received the RFWC data packet.

After sending the RRFWC data frame to the OLU 17, the FWDH 99 on the ONT 20 transitions to the state represented by block 756. In block 756, the FWDH 99 sets the PIR enable latch 105. Setting this latch allows the MPU 101 to take the next PIR interrupt that is generated by the PIR generator 102.

E. Efficiency Improvement

Transmission efficiency is not the primary criteria in the preferred embodiment of the present invention. The efficiency of the preferred embodiment is adequate for the 8-kbyte, or smaller, firmware message lengths that are expected at this time. On an error free link, the implementation discussed here can deliver an 8-kbyte message in approximately 0.1 seconds. If the firmware message lengths were to become longer than 128-kbytes, then a more efficient protocol would be necessary in order to improve delivery time.

One efficiency improvement would be to eliminate the unused bytes in the CEPT1 multiframe. The problem of unused timeslots is inherent any time TDM is used instead of statistical multiplexing, such as HDLC would use. It would be possible to use an additional overhead channel during the firmware download process to carry the firmware data packets. The resulting payload capacity available per multiframe would then be 400 bytes. If the packet information field length is still set at 256 bytes then three packet frames would contain 783 bytes, including packet overhead. Three packets could be fit into two CEPT1 multiframes, for a resulting payload utilization efficiency of 0.96 with respect to actual firmware data. A method would then be required for determining the boundaries of the two-multiframe groups. This could be accomplished by reserving one of the payload timeslots during the first CEPT1 frame of each multiframe to convey whether it was the first or second multiframe of the two-multiframe group. With this technique, it is thus possible to use the relatively deterministic nature of the message length to achieve a very high efficiency with the TDM system.

The second step to achieving higher efficiency would be to implement the protocol in a full-duplex mode. In this mode, the FWDH 99 on the ONT 20 would immediately send a message back to the FWDH 99 on the OLU 17 when the FWDH 99 on the ONT 20 had received a bad packet. To further increase the robustness of the protocol, this negative acknowledgement (NACK) from the FWDH 99 on the ONT 20 could carry the packet numbers of all packets that had been received in error at that time. The FWDH 99 on the OLU 17 would still wait until all packets had been transmitted the first time before beginning any retransmissions.

The above description of the preferred embodiment of the invention is intended to be illustrative only. Numerous alternative embodiments which would be within the spirit and scope of the present invention may be devised by those skilled in the art to which the present invention pertains.

We claim:

1. A multiplexing communications system comprising:

a first terminal means for transmitting and receiving user digitized data, a second terminal means for transmitting and receiving said user digitized data, and communications link means for conveying said user digitized data in either direction between said first terminal means and second terminal means, said communication link means comprising:

a plurality of user channels for conveying said user digitized data, and at least one overhead channel capable of conveying a first signal, wherein said first signal may be transmitted by either of said first download means or second download means for reception by either of said second download means or said first download means, said first signal being transmitted for initiating the transmission of said digital control data from said first terminal means to said second terminal means via at least some of said user channels, said first terminal means comprising digital control data for controlling said second terminal means, and first download means for transmitting said digital control data to said second terminal means via said communications link means;

said second terminal means comprising memory means for storing said digital control data, control means for controlling said second terminal means during its normal transmitting and receiving operations, said control means requiring said digital control data to be accessible from said memory means, and second download means for receiving said digital control data from said first download means via said communications link means.

2. The system of claim 1, wherein said digitized data comprises operational software or firmware.

3. The system of claim 1 wherein said communications link means is a fiber optic cable.

4. The system of claim 1 wherein said first and second terminal means transmit and receive said user digitized data in the form of a series of fixed length user packets, and wherein further said first and second download means transmit and receive said digital control data in the form of a series of fixed length download packets, each of said download packets having the same length as each of said user packets.

5. The system of claim 4 wherein each of said download packets further comprises a portion of said digital control data, said portion being a number of bytes which is a power of two, and an amount of filler data, said amount being that number of bytes which is necessary to make each said download packet the same length as each said user packet.

6. The system of claim 5 wherein each said user packet and each said download packet is a PCM multiframe.

7. The system of claim 6 wherein said PCM multiframe is a CEPT1 16 frame multiframe.

8. The system of claim 6 wherein said PCM multiframe is a DS1 24 frame multiframe.

9. The system of claim 6 wherein said PCM multiframe is a DS2 frame.

10. The system of claim 6 wherein said PCM multiframe is a DS3 frame.

11. The system of claim 6 wherein said PCM multiframe is a SONE frame.

12. The system of claim 5 wherein each download packet further comprises a control byte, said control byte having values which indicate that said download packet is the first download packet containing said digital control data, one of the second through penultimate of said download packets containing said digital control data, the last of said download packets containing said digital control data, a download packet not containing any of said digital control data, a download packet containing a portion of said digital control data which is being retransmitted to said second download means, a download packet not containing an portion of said digital control data but being an acknowledgment that all of said digital control data was successfully transmitted from said first download means to said second download means, and a download packet not containing any portion of said digital control data but being a signal that the transmission of said digital control data from said first download means to said second download means must be reinitialized.

13. The system of claim 12 wherein further said values of said control byte have a Hamming distance of at least 4 from one another.

14. The system of claim 5 wherein each of said download packets further comprises an address field containing a packet number which uniquely identifies the portion of said digital control data contained in said download packet.

15. The system of claim 14 further comprising mean for comparing said address field with a expected address value and generating an address error signal when a miscompare occurs.

16. The system of claim wherein each of said download packets further comprises a CRC16 field for detecting errors that occur in the transmission of said download packet from said first download means to said second download means.

17. The system of claim 14 wherein each of said download packets further comprises a CRC16 field for detecting errors that occur in the transmission of said download packet from said first download means to said second download means.

18. The system of claim 17 further comprising error tracking means for storing the packet address of each of said download packets in which an error was detected, wherein further said second download means sends a retransmission request packet to said first download means via said communications link means, said retransmission request packet comprising a second control field containing a value which indicates that this is a retransmission request, a length field containing a value corresponding to the number of download packets for which retransmission is requested, and a list of said packet addresses which were stored in said error tracking means.

19. The system of claim 18 wherein said error tracking means comprises a first stack means for storing, in the order of their detection, the packet address of each of said download packets in which an error was detected, and a second stack means for storing, in the order of their expected retransmission, the packet address of each of said download packets in which an error was detected.

* * * * *